(12) United States Patent
Waite et al.

(10) Patent No.: US 9,140,568 B2
(45) Date of Patent: Sep. 22, 2015

(54) MULTI-SCREEN VEHICLE SYSTEM

(75) Inventors: Stephen P. Waite, Blue Springs, MO (US); James E. Brockman, Liberty, MO (US); Marcus A. Moilanen, Overland Park, KS (US); James P. Ross, Centennial, CO (US); Brian G. Schoenfish, Kansas City, KS (US); David S. Wilson, Kansas City, MO (US)

(73) Assignee: Garmin Switzerland GmbH (CH)

( * ) Notice: Subject to any disclaimer, the term of this patent is extended or adjusted under 35 U.S.C. 154(b) by 620 days.

(21) Appl. No.: 13/235,156

(22) Filed: Sep. 16, 2011

(65) Prior Publication Data

US 2012/0072109 A1    Mar. 22, 2012

Related U.S. Application Data

(60) Provisional application No. 61/384,551, filed on Sep. 20, 2010, provisional application No. 61/426,353, filed on Dec. 22, 2010.

(51) Int. Cl.
*B60K 35/00* (2006.01)
*G01C 21/34* (2006.01)
*G01C 21/36* (2006.01)

(52) U.S. Cl.
CPC .............. *G01C 21/343* (2013.01); *B60K 35/00* (2013.01); *G01C 21/3484* (2013.01); *G01C 21/3679* (2013.01); *G01C 21/3697* (2013.01); *B60W 2550/402* (2013.01)

(58) Field of Classification Search
CPC ........ B60K 35/00; G01C 21/36; G01C 21/34; G01C 21/3697; G01C 21/3688; G01C 21/343; G01C 21/3484; G01C 23/00; B61L 27/0077; G06Q 10/087; G06Q 20/28; G06F 17/509

USPC ............. 701/25, 36, 201, 15, 33.4, 424, 533, 701/226, 249, 431, 465; 705/9, 15, 7.25, 705/7.35, 208, 75; 235/384, 385; 700/226; 703/2

See application file for complete search history.

(56) References Cited

U.S. PATENT DOCUMENTS 4,692,876 A * 9/1987 Tenma et al. ................. 700/249
5,074,144 A   12/1991 Krofchalk et al. ........... 73/117.3

(Continued)

OTHER PUBLICATIONS

Qualcomm, Mobile Computing Platform 100 Series, 2009.

(Continued)

*Primary Examiner* — Tuan C. To
*Assistant Examiner* — Yuri Kan
(74) *Attorney, Agent, or Firm* — Samuel M. Korte; Mohammad M. Ali

(57) ABSTRACT

A navigation system integrated into a materials transport vehicle for use by an operator, the system including a plurality of display devices each having a screen; a location determining component operable to determine the current location of the materials transport vehicle; a memory operable to store one or more modules, the memory including vehicle operator transport preferences comprising time periods available for operating the materials transport vehicle and materials transport requirements comprising a materials transport destination; and a processor operable to execute the one or more modules to determine a transport schedule for use by the materials transport vehicle operator, the transport schedule based on the materials transport requirements and the vehicle operator transport preferences, determine a transport route from the current location to the materials transport destination using the transport schedule, and present the transport route on one of the display devices.

23 Claims, 76 Drawing Sheets

(56) References Cited

U.S. PATENT DOCUMENTS

| | | | |
|---|---|---|---|
| 6,401,034 B1 | 6/2002 | Kaplan et al. | 701/209 |
| 6,411,888 B1 | 6/2002 | Weisman, II | 701/115 |
| 6,434,482 B1 | 8/2002 | Oshida et al. | 701/209 |
| 6,807,481 B1 | 10/2004 | Gastelum | 701/209 |
| 6,839,628 B1 | 1/2005 | Tu | 701/209 |
| 6,856,901 B2 | 2/2005 | Han | 701/211 |
| 7,082,359 B2 | 7/2006 | Breed | 701/36 |
| 7,155,339 B2 | 12/2006 | Tu | 701/209 |
| 7,395,237 B1 | 7/2008 | Hall et al. | 705/37 |
| 7,629,899 B2 | 12/2009 | Breed | 340/903 |
| 7,755,518 B2 | 7/2010 | Hersh et al. | 340/988 |
| 2004/0054607 A1* | 3/2004 | Waddington et al. | 705/28 |
| 2004/0236547 A1* | 11/2004 | Rappaport et al. | 703/2 |
| 2006/0010037 A1* | 1/2006 | Angert et al. | 705/15 |
| 2006/0261164 A1* | 11/2006 | Bochicchio | 235/385 |
| 2007/0050108 A1* | 3/2007 | Larschan et al. | 701/35 |
| 2008/0103686 A1* | 5/2008 | Alberth et al. | 701/200 |
| 2008/0228389 A1* | 9/2008 | Kano et al. | 701/204 |
| 2009/0005963 A1* | 1/2009 | Jarvinen | 701/201 |
| 2009/0171529 A1* | 7/2009 | Hayatoma | 701/36 |
| 2009/0198371 A1* | 8/2009 | Emanuel et al. | 700/226 |
| 2009/0254405 A1* | 10/2009 | Hollis | 705/9 |
| 2010/0262362 A1* | 10/2010 | Naito et al. | 701/204 |
| 2011/0130897 A1* | 6/2011 | Gladysz et al. | 701/15 |
| 2012/0036076 A1* | 2/2012 | Vanderwall et al. | 705/75 |
| 2012/0072266 A1* | 3/2012 | Schullian et al. | 705/7.35 |

OTHER PUBLICATIONS

Qualcomm, Mobile Computing Platform 200 Series, 2009.
Qualcomm, Trailer Tracks, 2009.
Qualcomm, Hours of Service, 2010.
Qualcomm, Performance Monitoring Featuring Fuel Manager Case Study, 2009.
PACCAR Truck Navigation by Garmin User's Guide, 2010.
Printout from http://corp.maptuit.com/index.php/solutions/overview, published prior to Sep. 16, 2011.

* cited by examiner

Navigation junction view intersection view next turn lane guidance rest area

Weigh Station

Layover Point

Layover Point

Maintenance

Hours of Service test for the hours of service popup

Diagnostics

Message

Incoming Call

Weather

ADAS

System Status Alert

Exemplary System Control Windows (202)

Media Player

Gauges

MULTI-SCREEN VEHICLE SYSTEM

The present application claims the benefit under 35 U.S.C. §119(e) of U.S. Provisional Application Ser. No. 61/384,551, entitled "Multi-Screen Vehicle System", filed Sep. 20, 2010, and U.S. Provisional Application Ser. No. 61/426,353, entitled "Multi-Screen Vehicle System", filed Dec. 22, 2010, which are herein incorporated by reference in its entirety.

BACKGROUND

Global Positioning Systems (GPS) have been developed to provide accurate positioning data. In traditional GPS systems, a receiver is used to capture input signals to identify a location of the receiver with respect to one or more GPS signal sources, such as satellites. In this manner, a device including the receiver may be used to navigate from the identified location to a designated location.

When the device is provided with a library of roadways (such as streets, avenues, boulevards, paths, highways, expressways, alleys, trails) the device may be capable of indicating a route between the identified and designated locations. For example, upon accepting an end point, the device may access a library containing roadway data to indicate which roadways may be used to reach the designated location.

Vehicle entertainment and infotainment systems are often configured for installation within vehicle dashboards for direct vehicle integration. Such systems may only provide select information and control for vehicle instrumentation and components, media, communication, entertainment, navigation, weather, scheduling, documenting content and functionality to vehicle operators and passengers. The systems may be installed within customized dashboards and standardized ports, such as DIN, double DIN, for ready access by the vehicle operators and passengers. Some systems may integrate with vehicle data buses (e.g., CAN) to acquire data related to operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
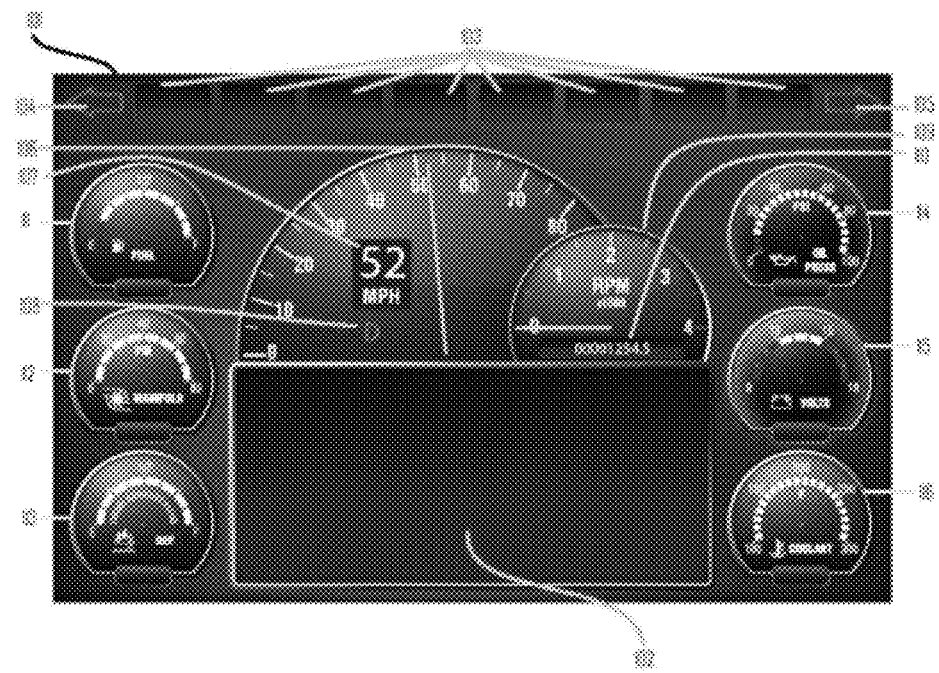
FIG. 1 is an exemplary screen capture of a primary display panel provided by a vehicle infotainment system configured in accordance with various embodiments of the present invention.

Various implementations of a vehicle infotainment system are described herein. Vehicles that may contain components of the system include, but are not limited to, automobiles, trucks, buses, two-wheeled motor vehicles, aircrafts, boats and other watercrafts, and any mobile structures capable of transporting loads of material to one or more geographic locations.

Various implementations of the system provide a comprehensive solution that simplifies the interface for vehicles while adding greater depth to the content available in the vehicle. The system serves as an intermediary between the vehicle operator, the vehicle, and remote systems. For example, in some configurations, two or more large electronic display panels are coupled with a vehicle dashboard to present various information to a vehicle operator. One or more of the displays may be a touchscreen to facilitate operator input. Further, it should be emphasized that the term input, when used in this description and in the appended claims to indicate included features, elements, or steps, is in no way to be interpreted as excluding the use of input controls independent of a touchscreen. In some embodiments, operator input may be provided using input controls coupled with a steering wheel or the vehicle's center console, armrest, or support trim. In some embodiments, the input controls may comprise a touchscreen.

In some embodiments, a remote server may be used to manage the requests of one or more systems or a server for a third party, such as a fleet management system managing a fleet of vehicles. The remote server may be a centralized server or a group of servers operating cohesively. The system provides the functionality described herein by integrating and facilitating the exchange of: (i) vehicle and system information presented to an operator; and (ii) vehicle and system control commands inputted by the vehicle operator or third party.

The system presents vehicle operators and passengers access to local and/or remote vehicle, navigation, media, communication, and scheduling information and functionality. The vehicle information presented to the operator may include, but is not limited to, instrumentation information, vehicle signal indicators, diagnostic data, and trailer information. The system may incorporate messaging, audio, cabin climate, trailer status, driver data, diagnostics, and weather information with the navigation, media, and communication information. The scheduling information and functionality assists operators with managing their driving schedules in a comprehensive solution.

The system may provide the operator full access to the software and/or operating system for the system that may be located on-board the vehicle or at a remote location. In some embodiments, the access may be given using the equipment installed in the vehicle, one or more serial ports for communication with equipment not installed in the vehicle, and equipment using wireless communication methods (i.e., cellular and/or satellite networks.

The system is capable of receiving information and/or input from the vehicle operator, wireless data broadcasts, and remote servers. In some embodiments, the system may receive and process control commands. The control commands may manage elements including, but not limited to, the vehicle and trailer(s), audio and entertainment system, cab and sleeper climate, navigation system, media (i.e., broadcast entertainment, web browser, etc), communication, scheduling information, and system interfaces. In some embodiments, the system may receive and process information from the vehicle itself (i.e., diagnostics).

In some embodiments, the system comprises sub-systems that provide specific information and functionality provided to vehicle operator and third parties. The sub-systems may include, but are not limited to, a navigation system with mapping and routing information from the routing module, dynamic lane guidance, lane detection, collision monitoring, backup camera and/or sensor output, blind spot information, driver alerts, trip information, truck information, trailer information, diagnostic information, warnings, infotainment system settings, web browser, relevant travel information, time, and any other information, functionality, or content that may be provided to the vehicle operator and third parties. In some embodiments, the sub-systems may be linked to a routing module and/or location determining component. The location determining component may include, but is not limited to, a GPS receiver and/or A-GPS functionality provided by cellular network providers.

In the following discussion, an exemplary environment is first described. Exemplary procedures are then described which may employed in the exemplary environment, as well as in other environments without departing from the spirit and scope thereof.

Infotainment System

Figure 14:
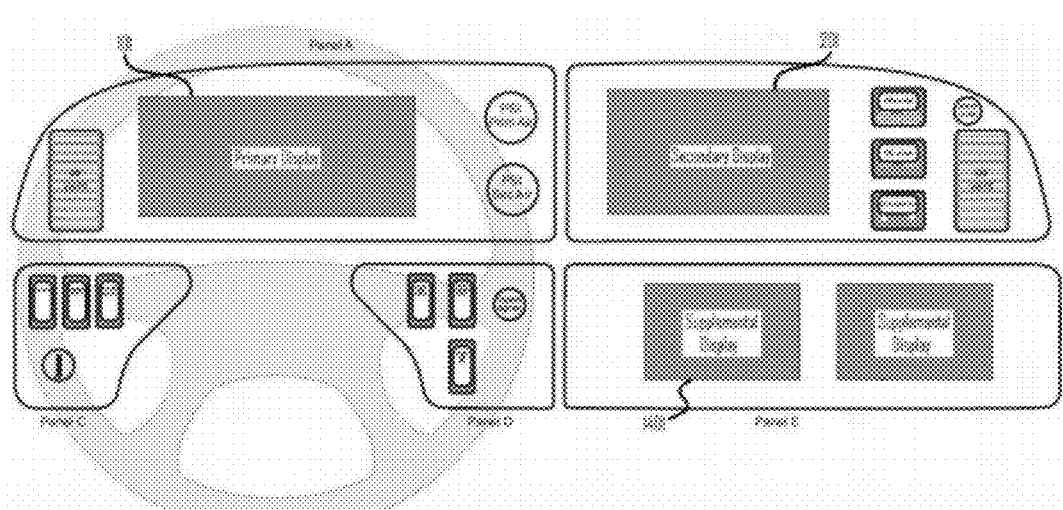
FIGS. 14-16 are exemplary configurations of elements provided by a vehicle infotainment system within the vehicle dashboard in accordance with various embodiments of the present invention.
Figure 15:
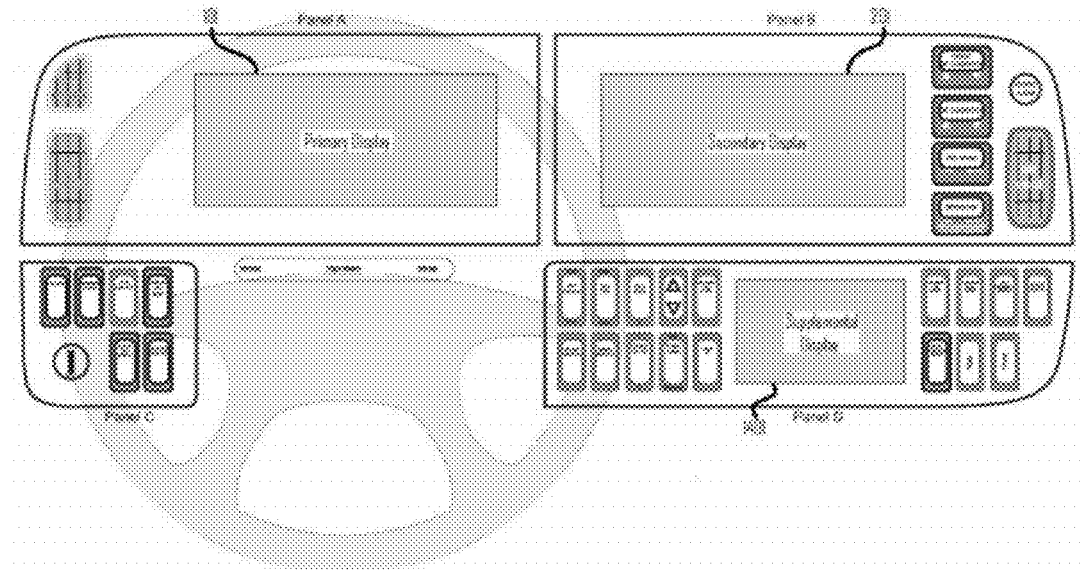
Figure 16:
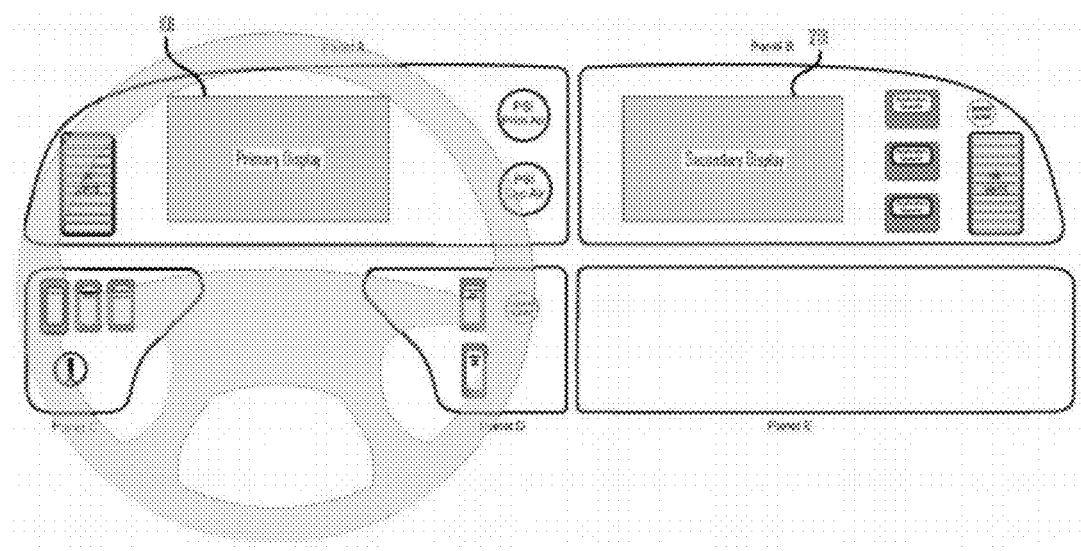
Figure 17:
FIGS. 17-30 are exemplary screen captures of the secondary display panel of FIG. 2, the secondary display panel presenting diagnostics controls within the center region.
Figure 18:
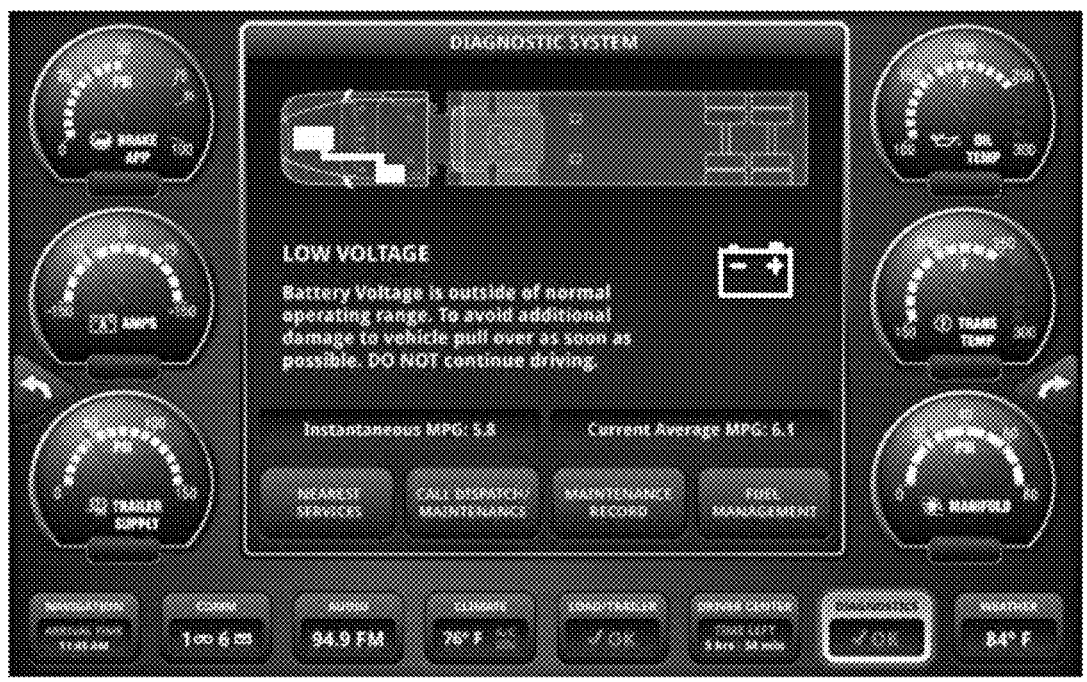
Figure 19:
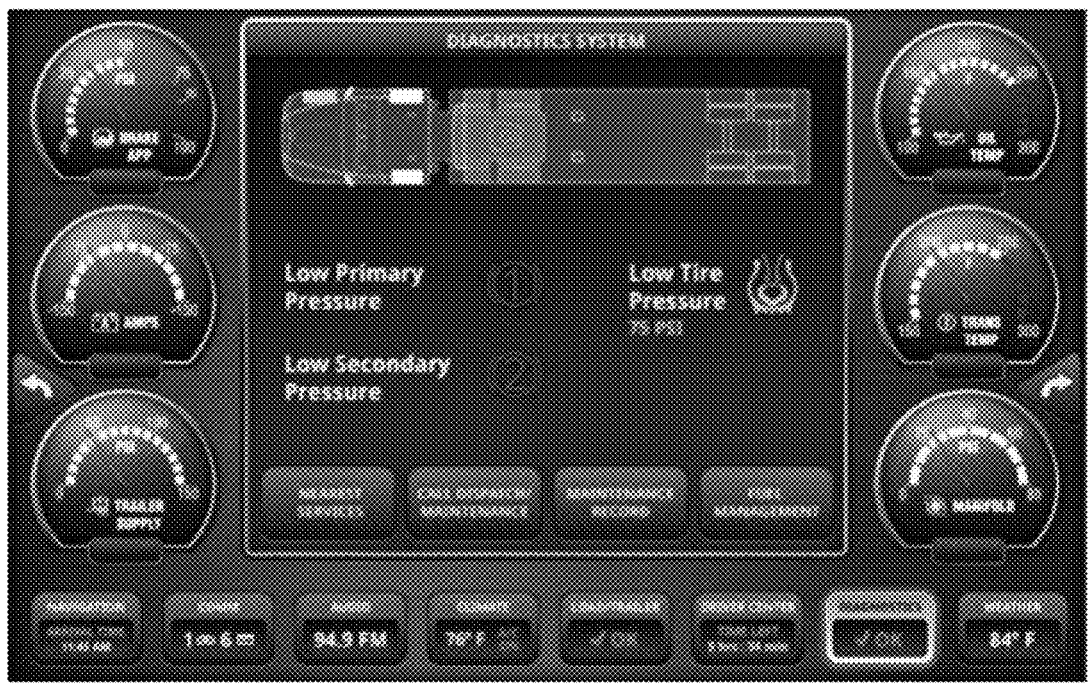
Figure 20:
Figure 21:
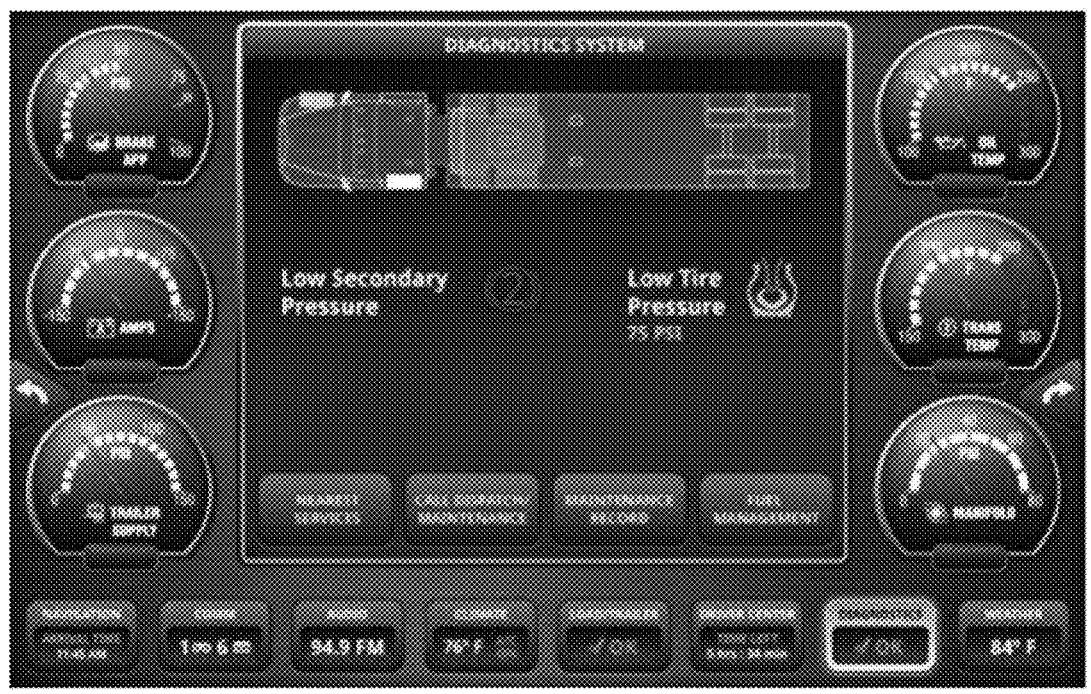
Figure 22:
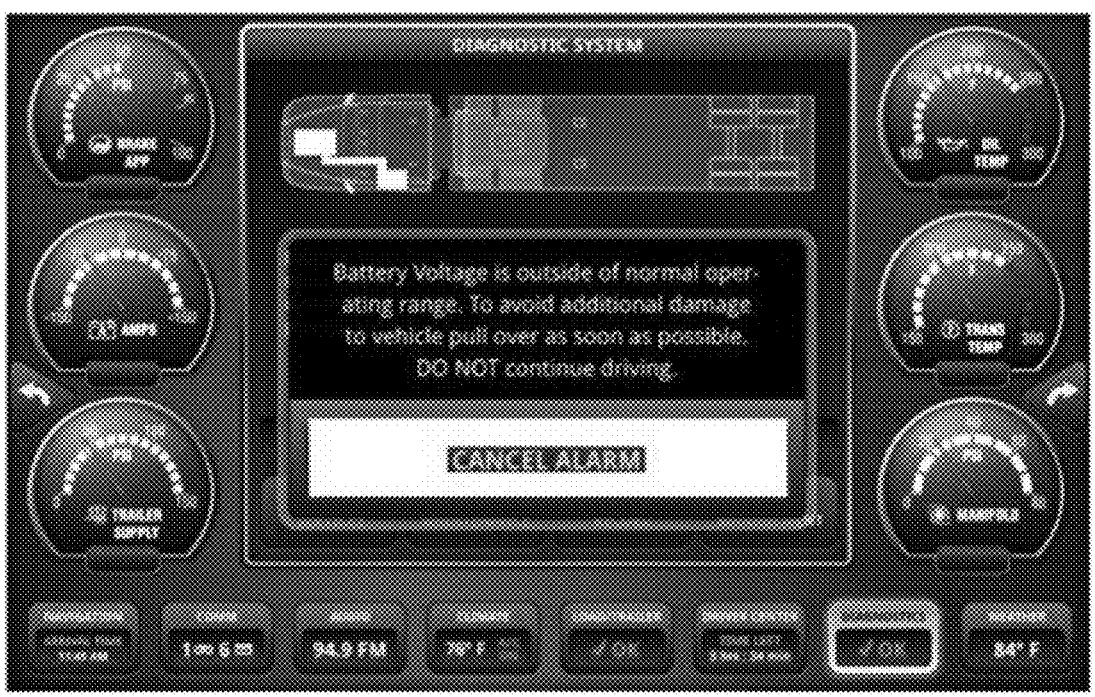

As shown in FIGS. 14-16, the vehicle infotainment system may include two or more independent display panels of sizes suitable for installation on the dashboard or other locations in the cab. The dashboard may be primarily flat against the front of the cabin, have portions protruding from the front of the cabin, curved to provide optimal accessibility for the truck operator and passengers, or separated with portions positioned above the windshield.

The system may employ a variety of configurations to maximize accessibility and aid in the visibility of the display panels within the vehicle cab. In some embodiments, the display panels are installed, or may be adjusted to be positioned, to be within an arm's length distance of the operator to provide for touch input. The display panels may be installed in other areas of the cab, such as the cab sleeper area, for use at times when the vehicle is stationary and/or in motion. In some configurations, the contents of various display panels may be consolidated into a single display panel. The single display panel would also be mounted within the operator's arm's length proximity. In some embodiments, the system may be configured to externally mount the display panels or communicate the contents of the display panels using a portable electronic device.

The system may use one or more sub-systems to provide functionality to assist the vehicle operator with operating the vehicle and/or management of services related to the operation of the vehicle. In some embodiments, these sub-systems may be started automatically if the system determines that certain conditions exist. For instance, one or more sub-systems may be started if the system determines that the operator's visibility may be limited (i.e., night time, fog, heavy precipitation, etc).

In some embodiments, dynamic lane guidance functionality is used to assist the operator with determining which lanes properly position the vehicle for upcoming road variations, turn points, and intersections.

In some embodiments, lane detection functionality is used to assist the operator with determining whether the vehicle may have inadvertently crossed a driving road lane boundary and entered another road lane or shoulder area. In some embodiments, the system may determine the current position of the vehicle relative to driving road lanes by using image pattern recognition and/or a location determining component.

In some embodiments, collision monitoring functionality is used to assist the operator with determining the presence of objects located in front of or behind the vehicle. In some embodiments, the system uses signal reflection technologies such as infrared (IR) signal reflection. Signal reflection technologies detect the presence of objects by using one or more signal transmitting units and one or more receiving sensors to collect any signals that have been reflected off the surface of the objects. In some embodiments, the infrared (IR) signal reflection is used by the system to create an image of the detected object(s) based on the signals received by the receiving sensors. The system may present the images to the operator using one or more display panels or a projector system. The projector system may be a heads-up display technology that presents information on the vehicle windshield or a three-dimensional technology that may be presented anywhere in the vehicle cab.

In some embodiments, scheduling functionality may be used to assist one or more operators with managing their driving schedules, loads, and routes in a comprehensive solution. In some embodiments, the vehicle being operated is a truck and the operators are truck operators. Use of the scheduling functionality may be mandatory if the truck operator is a member of a third party fleet management system. In some embodiments, the system assists truck operators by managing their compliance with extensive regulations and fleet requirements such as the number of hours that may be used to rest and operate the truck, stops at weigh points where the truck must be weighed, and financial considerations for managing loads. The system may manage the truck operators as independent drivers or members of a third party fleet management system. In some embodiments, the truck operator may be directed to make stops and deliveries by third parties (i.e., fleet management).

The system may identify time periods available for operating the vehicle. In some embodiments, the time periods are identified by a vehicle operator or by using a vehicle operator's historical vehicle operation information. For instance, the operator may identify daytime hours as the preferred time of day to operate a vehicle. In some embodiments, the vehicle operator may be presented options that may be selected using a touchscreen to input the operator's preferences for operating the vehicle. For instance, the vehicle operator may select a daytime preference for operating the vehicle or route calculations that do not route through high traffic areas (i.e., high traffic, major metropolitan areas, etc). In some embodiments, the system may identify evening hours available for operating a vehicle based on historical data of the vehicle operator. The system may identify a trend of recurring activities to identify the vehicle operator's preferences. For instance, if the vehicle operator routinely rests during a certain time period, the system will identify that time period as unavailable for operating a vehicle.

In some embodiments, the system assists truck operators by managing the order in which transported materials are loaded and unloaded from the truck. The system may determine the optimum order of loading and unloading transported materials based on variations in the size, weight, or perishability of transported materials. In some embodiments, the variations may be quantified determining a loading cost associated with a transported material. For instance, a higher loading cost may be determined for a transported material that requires more time for it to be loaded and/or unloaded from the truck in comparison to other transported materials. A higher loading cost may be determined for a transported material that is more perishable (i.e., deteriorates in quality) in comparison to other transported materials. In some embodiments, the system may integrate loading cost and locations for loading and unloading transported materials into route recommendations for the truck operator. For instance, the system may determine an optimal route that minimizes the time required to load and unload transported materials that are being transported for a truck operator who is loading and unloading transported materials of varying size and weight in different locations. In some embodiments, the system may also integrate fuel range and fuel weight in the process of determining an optimal route for a truck operator.

In some embodiments, transport requirements may be associated with a load of materials. For instance, the load of materials may require delivery to a destination location within a certain period of time, environmental conditions (e.g., humidity, temperature, lighting, etc), equipment required (e.g., pallets, fork lift, dolly, etc), insurance coverage, or delivery terms. The system may incorporate the transport requirements into an operator's driving schedule and/or route recommendations. For instance, if transport requirements require a vehicle operator to deliver materials of a large size within 3 days, the system may determine a route that manages the trailer to ensure that the trailer to have enough space for loading the large-sized materials and delivers the materials to a desired destination within 3 days.

The system communicates information to the operator and receives information from the operator in a seamless and efficient manner. In some embodiments, the system uses two or more display panels to communicate information to the operator and an interface for the operator to input control commands to manage elements controlled by the system.

The system is capable of receiving information and/or control commands from the vehicle operator, wireless data broadcasts, and remote servers. The interface between the system and vehicle operator may provide for operator input control commands using push-buttons, touch-sensitive display panels with infrared (IR), resistive, or capacitive technology, universal serial bus (USB) devices, external keyboards, audible communications including automatic speech recognition (ASR) functionality, open wireless technologies for exchanging data over short distances from fixed and mobile devices of communication including, but not limited to, analog radio frequency (RF), personal area networks (i.e., Bluetooth, infrared (IR) wireless, ultra wideband (UWB), ZigBee, etc.), and wireless local area networks (i.e., IEEE 802.11). The methods used by the system to receive information using wireless data broadcasts may include standardized or proprietary signal broadcasts from broadcast towers and base stations installed at fixed or mobile locations. For instance, the system includes a transceiver capable of transmitting and receiving communication signals for Citizens' Band (CB) radio. The system may communicate CB radio signals with operators and passengers traveling in another vehicle or by individuals using a CB radio base station installed at a fixed location. In some embodiments, the system may receive wireless data broadcasts from warehouses broadcasting low-power signals for vehicles that visit the warehouse for picking up and/or dropping off loads. The methods that may be used by the system to receive information from remote servers include long-range and short-range wireless networks include, but are not limited to, frequency modulation (FM), orbital and land-based satellites, cellular phone networks, and other wireless methods (e.g., Wi-Fi (IEEE 802.11), Bluetooth, infrared (IR) wireless, ultra wideband (UWB), ZigBee, etc.). For instance, the system may include one or more radio modules for receiving and transmitting signals for wireless data broadcasts and communication with remote devices. In one embodiment, the system includes a cellular transceiver for transmitting and sending data to and from one or more remote servers. In one implementation, the cellular transceiver is a GSM modem. The GSM modem may be coupled with an external cellular antenna that connects to the rear of the system. In some implementations, the system may include an integral antenna to eliminate the need for a cumbersome and difficult-to-install external antenna. For instance, a GSM antenna may be integrated within the GSM modem, which may in turn be placed towards the face of the system (e.g., within or near the system's faceplate to enable cellular reception).

The system is designed to provide information, routes, and scheduling guidance based on the current location of the vehicle, fuel, and materials being transported using the vehicle. Scheduling guidance may include optimum layover points based on hours an operator has operated the vehicle. If the operator is restricted by a maximum number of hours the vehicle may be operated, the scheduling guidance may incorporate the hours a vehicle was operated and the hours available for operating the vehicle. In some embodiments, the location determining component is used to determine the current location of the vehicle. The system may automatically adjust if it determines that the current location of the vehicle requires adjustment of one or more elements. For instance, the legal requirements and customs may be adjusted automatically if the system determines that the vehicle has crossed the border from a country that uses the metric system to a country that uses another system of measurement, such as the U.S. customary system using inches and miles, the system will automatically adjust the navigation system, the instrumentation (i.e., units for measuring vehicle velocity), and driving and load regulations for the country in which the vehicle has entered.

The display panels may include a primary display panel, a secondary display panel, and one or more supplemental display panels. Depending on the type of vehicle, the display panels may be positioned on the dashboard, a console mounted onto the vehicle cabin floor, above the vehicle windshield, in the vehicle cab sleeper, below the instrument panel either entirely on or partially on the cabin floor panel, or external from the cab. In some embodiments, the display panels may be adjusted to move or tilt from the mounted position to any position. For instance, a display panel installed in the dash board may be moved closer to or further from the vehicle operator, tilted in three hundred and sixty degrees, or any other position to allow the operator to access its contents.

The display panels may provide functionality that presents content in a high resolution image while enabling user input of control commands. The display panels may visually present content using a liquid crystal display (LCD), light-emitting diode (LED) display, plasma display panel (PDP), holographic, or other electronic visual display methods. The display panels may provide for user input by using a touch screen with infrared (IR), resistive, capacitive, or other touch sensing technology.

As shown in FIGS. 14-16, some configurations of the system may use any combination of a primary display panel 101, a secondary display panel 201, and one or more supplemental display panels 1401, if any. For instance, the secondary display panel 201 may be positioned adjacent to, below, integrated with, or on the opposite side of the windshield to the primary display panel 101. The primary display panel 101 may be positioned in a location within the cab where the vehicle operator may view all of its contents. As shown in FIGS. 14-16, the primary display panel 101 may be positioned directly in front of the steering wheel in some instances.

The primary display panel 101 may be used to communicate current truck instrumentation readings and information of high importance to the truck operator. The system provides functionality for the truck operator or a third party to customize the contents of the primary display panel 101. For instance, the contents of the primary display panel 101 may be customized to include optional instrumentation readings that the truck operator has selected to be presented in addition to default and/or legally required instrumentation in the instrument panel.

The primary display panel 101 may also include one or more high resolution information center displays 102. The information center displays 102 provide flexibility in the display output for the system. In some embodiments, the information center displays 102 are used to interchangeably present all new and/or existing content that is not currently presented on other portions of the primary display panel 101 or other display panels.

A secondary display panel 201 may be used to present instrumentation, information, and entertainment content. The presented content may be stored and/or originated locally or remotely.

As shown in FIGS. 2-5, the secondary display panel 201 may be used primarily to provide an interface mode for the vehicle operator to input control commands to manage the navigation, messaging, audio, climate control, trailer information, driver data, diagnostics, and weather interface modes. In some embodiments, two or more of the interface modes may be available simultaneously on the secondary display panel 201.

One or more supplemental display panels 1401 may be used to provide additional system flexibility. The supplemental display panels 1401 may present the same content as the primary display panel 101 and secondary display panel 201. As shown in FIGS. 14 and 15, there are various configurations for the infotainment system to incorporate one or more supplemental display panels 1401.

In some embodiments, a secondary display panel 201 may be positioned in a vehicle's sleeper area to facilitate system access to passengers. A secondary display panel 201 in a vehicle's sleeper area may present content that may be presented in the primary display panel 101 and secondary display panel 201 accessible to the vehicle operator. The vehicle passenger may input control commands to manage content presented in the secondary display panel 201 from the vehicle's sleeper area.

The system may also include one or more routing modules to process cartographic data in conjunction with one or more location determining components (i.e., GPS receivers). The cartographic data may be stored within the memory and/or acquired from a remote service via one or more communication elements. The routing module is representative of functionality to determine a suitable route between two locations. The routing module may use cartographic data to determine the shortest, fastest, and/or most fuel economical route between two locations. For instance, the routing module may be used to route the vehicle to any destination, calculate the estimated time of arrival (ETA) and determine the status of the vehicle compared to the scheduled locations (i.e., ahead of schedule, behind schedule, or on schedule), or update the route to meet scheduling requirements. The routing information may be presented to the operator using any of the display panels and/or audible communications.

The system may further include functionality enabling it to identify and manage the vehicle operator. In some embodiments, the vehicle operator may be identified from a key, electronic vehicle entry or operation device (e.g., keyless entry transmitter, vehicle remote start transmitter, portable media device, cellular telephone, etc). The system may manipulate information presented to the vehicle operator in an arrangement associated with the vehicle operator. For instance, the system may identify a vehicle operator and customize the information presented to him accordingly. If the system identifies multiple vehicle operators alternating vehicle operation, the system may manage the driving schedules of both drivers. In some embodiments, the vehicle may modify adjustable elements, such as the operator's preferred time of day to operate the vehicle, preferred route characteristics, to accommodate the identified vehicle operator.

In some embodiments, the system may identify the location of vehicle and associate geographic information with vehicle settings. For instance, the system may identify vehicle altitude and adjust the vehicle's gear changes and air-to-fuel ratio to optimize vehicle operation. The system may identify the vehicle's location as a mountain range and adjust the vehicle's traction control and brake configurations.

The system may further include one or more processors, memory, communication modules, sensors, media drives, coolers, fans, and connectors to add additional hardware. One or more of these components may perform the functions and operations stated herein.

In some embodiments, the information, content, and control commands may be limited when the current velocity of the vehicle exceeds a predetermined threshold velocity. For instance, the predetermined threshold velocity may be five miles per hour.

Primary Display Panel—Containing Digital Instrument Panel Portion

As shown in FIG. 1, the primary display panel 101 may be used to present a digital instrument panel portion and one or more information center displays 102. The system provides functionality allowing the operator to customize the presentation and/or appearance of elements presented in the primary display panel 101. The content of the digital instrument panel portion and the information center displays 102 may be resized or repositioned by the system, third party, or the operator. For embodiments where the primary display panel 101 is configured as a touch screen, the digital instrument panel portion may present switches providing for user input.

The digital instrument panel portion presents instrumentation content communicating information on the vehicle's operation. The digital instrument panel portion may encompass all of the contents of the primary display panel 101 excluding the information center display 102. In some embodiments, the contents presented by the primary display panel 101 may be limited to only the digital instrument panel portion. The system may also present some or all of the content of the digital instrument panel portion in the form of an analog tachometer reading or an instant reading.

The instrumentation content that is presented to the operator in the digital instrument panel portion may include, but is not limited to, diagnostic warning indicators 103, left turn signals 104, right turn signals 105, analog speedometers 106, instant speedometers 107, active gears for the transmission 108, engine tachometers 109, odometers 110, and any other sensor readings or calculations related to the performance of the truck or trailer. The diagnostic warning indicators 103 may be associated with content presented on the secondary display 201. In some embodiments, a diagnostic warning indicator 103 may present a current status of a system presented on secondary display 201. The presented sensors and gauges may include, but are not limited to, fuel gauges 111, pressure sensors 112, exhaust fluid levels 113, oil pressure sensors 114, battery voltages 115, coolant temperature sensors 116, oil temperature sensors, clock, amperage for electrical system, air filter sensor, suspension loads for various points along the cargo trailer, oil sensors for drive axles, brake pressure sensors, brake air tank pressure sensors, headlight indicators, taillight indicators, cargo trailer environment sensors, and various other notifications that may be commonly used in a truck's instrument panel.

The digital instrument panel portion may present information related to the truck's instant velocity, e.g., speed, using an analog speedometer 106 and/or instant speedometer 107. The system provides functionality allowing the truck operator to customize the content by manually adjusting the units of the presented speed information between miles per hour (mph), kilometers per hour (kph), or any other measurement indicating the truck's traveling rate.

In some embodiments, the system may automatically adjust the measurement units of the truck's speed to the measuring system that is used in the current geographic location of the truck. The system may use the location determining component to determine the current location of the truck. For instance, if the system determines that the truck has transitioned from a geographic region where the metric system is used to a geographic region where the US customary units are used, the system may automatically change the units of indicating speed from kilometers per hour (kph) to miles per hour (mph).

The digital instrument panel portion may also provide information regarding the fuel economy for the vehicle. This includes, but is not limited to, historic fuel economy data, current fuel economy estimate based on engine performance, and fuel economy forecasts based on travel information. In some embodiments, the system may determine, and present an indication to the operator of the optimal moment to shift transmission gears based on performance and/or fuel economy criteria.

The digital instrument panel portion may also provide information regarding the distance traveled by the vehicle. In some embodiments, this includes presenting one or more odometers 110. The odometer 110 may indicate the total distance traveled since the truck was manufactured and the distance traveled since the odometer was reset. In some embodiments, the odometer 110 may present the remaining distance to a point of interest or turning point, which may be calculated by the system or inputted by the operator.

Primary Display Panel—Containing Information Center Displays

As shown in FIG. 1, the primary display panel 101 may also contain one or more high resolution information center displays 102 in addition to the digital instrument panel portion. Information center displays 102 may be used to present any information to the vehicle operator and provide an area to receive user touch input. The information center display 102 may enable the operator to easily be apprised of communication, navigation, and/or entertainment information regardless of that same information currently being made available elsewhere by the infotainment system.

In some embodiments, an information center display 102 may be used to notify the operator of various information. The information that may be presented to the operator includes, but is not limited to, navigation interface with mapping and routing information from the routing module, wireless communication information, dynamic lane guidance, backup camera and/or sensor output, blind spot information, driver alerts, trip information, truck information, trailer information, diagnostic information, warnings, infotainment system settings, web browser, relevant travel information, time, and any other content the system, truck operator, or third party chooses to present. Wireless information that may be integrated into the system may include the communication frequency (e.g., CB radio frequency) currently being used by the truck operator. In some embodiments, the system may provide functionality enabling a truck operator to select a communication frequency, initiate and terminate the transmission of audio signals, and monitor communication frequencies for activity. Dynamic lane guidance functionality assists the operator with determining which lane to be drive in for upcoming road variations, turn points, and intersections. In some embodiments, dynamic lane guidance is linked to the routing module.

In some embodiments, the system may use the information center display 102 to present information received from a remote source, such as a remote server or wireless broadcast. For instance, the information center display 102 may present electronic messages, internet content, and other forms of electronic information.

In some embodiments, the system may present critical and/or time sensitive information, (i.e., diagnostic or communication warnings) on the information center display 102. The system may provide functionality to customize the contents to include indication of new information received from a remote source. For instance, indication may be provided from a flashing or solid dedicated icon or text that appears until it has been acknowledged by the operator. The indication of new information may be presented only for a predetermined period of time.

In some embodiments, the content or portions of content currently presented in the information center display 102 may contract and expand to show new and relevant information. As the infotainment system and/or vehicle operator change the presented content, the new and pre-existing contents may move about to various forms and positions within the information center display 102.

Secondary Display Panel—Containing System
Control Windows and Selection Inputs

Figure 2:
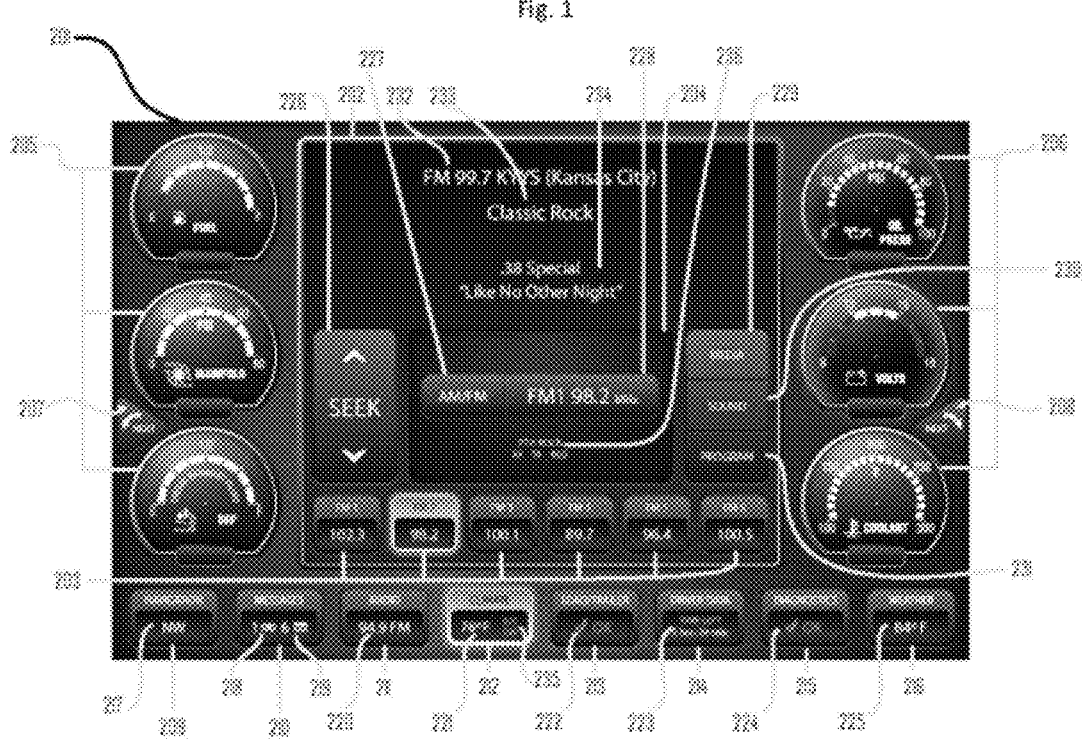
FIG. 2 is an exemplary screen capture of a secondary display panel provided by the vehicle infotainment system of FIG. 1, the secondary display panel presenting audio controls within a center region

The system may present one or more selected interface modes within a system control window 202. The interface mode is a collection of operator inputs and information to be communicated to the operator. The system control window 202 presents information and criteria controls for the selected interface mode. In some embodiments, the content or portions of content currently presented in the system control window 202 may contract and expand to show new and relevant information. In some embodiments, the available interface modes may include navigation, messages, audio, climate, load/trailer, driver data, diagnostics, and weather. As shown in FIG. 2, the system provides functionality for the operator to select one or more interface modes using selection inputs 209-216, which may include, but are not limited to, navigation 209, messages 210, audio 211, climate 212, load/trailer 213, driver data 214, diagnostics 215, and weather 216.

Figure 3:
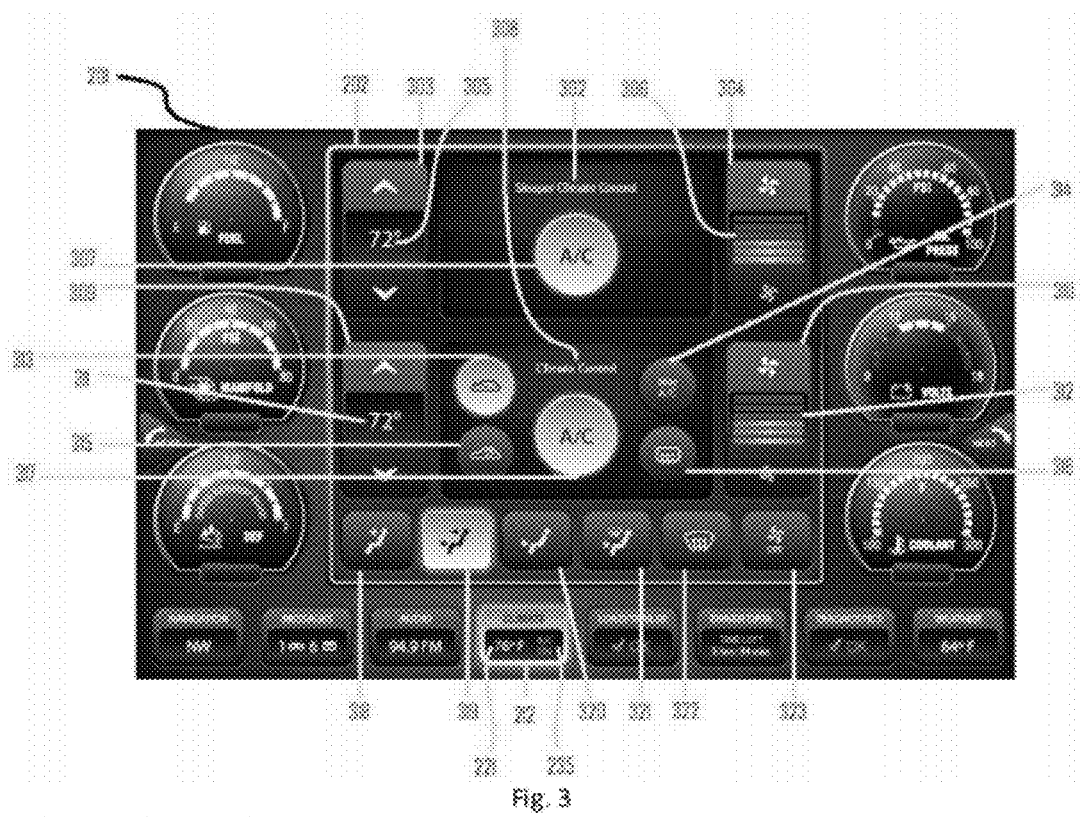
FIG. 3 is an exemplary screen capture of the secondary display panel of FIG. 2, the secondary display panel presenting climate controls within the center region.

The available selection inputs 209-216 may be presented anywhere in the secondary display panel 201. As shown in FIG. 2, the selection inputs 209-216 may be positioned along the lower portion of the secondary display panel 201. In some embodiments, the interface mode that is actively selected may be indicated in some manner by the selection input. As shown in FIG. 3, the secondary display panel 201 is in climate control interface mode and the climate selection input 212 is highlighted along the perimeter of the input.

The selection inputs 209-216 may contain useful information that is presented within their boundaries to communicate some information without requiring the operator to select the interface mode. In some embodiments, the navigation selection input 209 may contain the current heading 217, the messaging selection input 210 may contain voicemail information 218 and email information 219, the audio selection input 211 may contain the current radio station or track information 220, the climate selection input 212 may contain the current or desired cab temperature 221 and air conditioning status 235, the load/trailer selection input 213 may contain the trailer's diagnostic information 222, the driver data selection input 214 may contain driving time information 214, the diagnostics selection input 215 may contain the truck's current diagnostic information 224, and the weather selection input 216 may contain the current weather information 216.

In some embodiments, the system control window 202 allows for touch input from the operator because the secondary display panel 201 is a touch screen. The operator may input desired changes using touch input functionality. In some embodiments, the currently selected controls are indicated in some manner, such as a different color of highlighting. As shown in FIG. 3, currently selected climate criteria controls 307, 313, 317, and 319 are highlighted to communicate their selection to the operator.

Secondary Display Panel—Containing Independent
Enhancement Elements

The vehicle operator may choose to present independent enhancement elements 205, 206 in the secondary display panel 201. The enhancement elements 205, 206 may be instrumentation, communication information, or media content. In some embodiments, the vehicle operator may customize the content, size, number, and layout of presented enhancement elements 205, 206. As shown in FIG. 2, the presented enhancement elements 205, 206 may be full-size instrumentation gauges on each side of the system control window 202.

In some embodiments, the system will change the content of independent enhancement elements 205, 206 when it receives an inputted control command from the vehicle operator to make such a change. For instance, the change may be a rotation introducing one or more previously hidden enhancement elements. As shown in FIG. 2, the system may change the presented enhancement elements 205, 206 by selecting incrementor 207 to change the enhancement elements 205 or by selecting incrementor 208 to change enhancement elements 206.

Secondary Display Panel—Audio Interface Mode

As shown in FIG. 2, the secondary display panel 201 may be used in an audio interface mode to provide the vehicle operator information and controls for one or more available audio sources. While the secondary display panel 201 is in the audio interface mode, the presented contents may include any combination of one or more system control windows 202, enhancement elements 205, 206, and selection inputs for available interface modes.

The system control window 202 presents audio information and audio criteria controls. As shown in FIG. 2, the presented audio information may include audio modulation information 232, audio genre information 233, current track information 234, and related audio information 236. Additionally, the audio criteria controls may include stored channel inputs 203, channel seek input 226, audio modulation selection input 227, channel grouping selection input 228, media menu 229, sound menu 230, and program menu 231.

In some embodiments, the system may automatically populate the stored channel inputs with available broadcast frequencies based on the current geographic location of the truck. The system may determine the current positioning data for the vehicle by using a location determining component, such as GPS components or A-GPS functionality provided by cellular network providers.

In some embodiments, where the secondary display panel 201 is a touch screen, the system may provide for the functionality allowing the operator to touch and slide a frequency indicator along a graphical frequency range to rapidly select the desired radio frequency. Additionally, the system may provide radio present functionality that enables the operator to assign new values to stored channel inputs 203 using the touch screen by simply pressing and holding one stored channel input 203 to assign the currently-tuned radio station as the value for that stored channel input 203.

Secondary Display Panel—Climate Control Interface Mode

As shown in FIG. 3, the secondary display panel 201 may be used in a climate control interface mode to provide the vehicle operator information and controls regarding the climate of the vehicle cab, sleeper, and trailer, if any. While the secondary display panel 201 is in the climate control interface mode, the presented contents may include one or more system control windows 202, enhancement elements 205, 206, and selection inputs 209-216 for available interface modes.

The system control window 202 may present any combination of climate control information and climate criteria controls. In some embodiments, the climate control interface may be limited to cab and sleeper areas. As shown in FIG. 3, the system control window 202 may be separated into truck sleeper climate control region 302 and truck cab climate control region 308. The presented climate control information may include current vehicle sleeper temperature 305, current truck cab temperature 311, truck sleeper fan level 306, truck cab fan level 312. Additionally, the climate criteria controls may include truck cab temperature adjustment 309, truck sleeper temperature adjustment 303, truck cab fan adjustment 310, truck sleeper fan adjustment 304, truck cab air conditioning switch 317, truck cab air max air conditioning switch 314, truck sleeper air conditioning switch 307, rear defrost 316, exterior air flow switch 313, circulated air flow switch 315, air flow areas 318-322, and an off switch 323.

Secondary Display Panel—Driver Data Interface Mode

Figure 4:
FIG. 4 is an exemplary screen capture of the secondary display panel of FIG. 2, the secondary display panel presenting driver data controls within the center region.

As shown in FIG. 4, the secondary display panel 201 may be used in a driver data interface mode to provide the vehicle operator information and controls to review and configure driver data for one or more operators that may operate the vehicle in which the system is installed. While the secondary display panel 201 is in the driver data interface mode, the presented contents may include one or more system control windows 202, enhancement elements 205, 206, and selection inputs 209-216 for available interface modes.

The system provides functionality for the vehicle operator to manage his driving schedule. The system manages and presents a driver's record recommended schedule 600 for the vehicle operator to efficiently complete the travel requirements.

In some embodiments, managing the driver's record recommended schedule 600 includes optimization techniques. For instance, the driving schedule may be optimized for least driving time, distance, or any other criteria that may be optimized by the system.

The system allows the operator to optimize the driver's record recommended schedule 600 or include any criteria in the evaluation of the driving schedule. In some embodiments, the vehicle operators may elect for the system to assess operator-specific criteria and general criteria in the driving schedule. The operator-specific criteria include, but are not limited to, the operator's travel data, preferred driving hours, driving schedule, planned stops, future and active loads, unavailable personal days, employer and/or contract requirements, and other information specific to the operator. The general criteria include, but are not limited to, the current geographic location of the truck, distance between points of interest, fuel economy, traffic projections, fleet management data, and other information useful to all operators.

In some embodiments, the system may determine the current positioning data for the truck by using the location determining component or user input to factor the current location of the truck into the driver schedule and optimization techniques.

In some embodiments, the system applies local driving regulations based on the current geographic location of the truck. For instance, if the system determines the truck's current position is in Mexico, it will factor any applicable driving regulations for Mexico into the driver's record recommended schedule 600.

Figure 6:
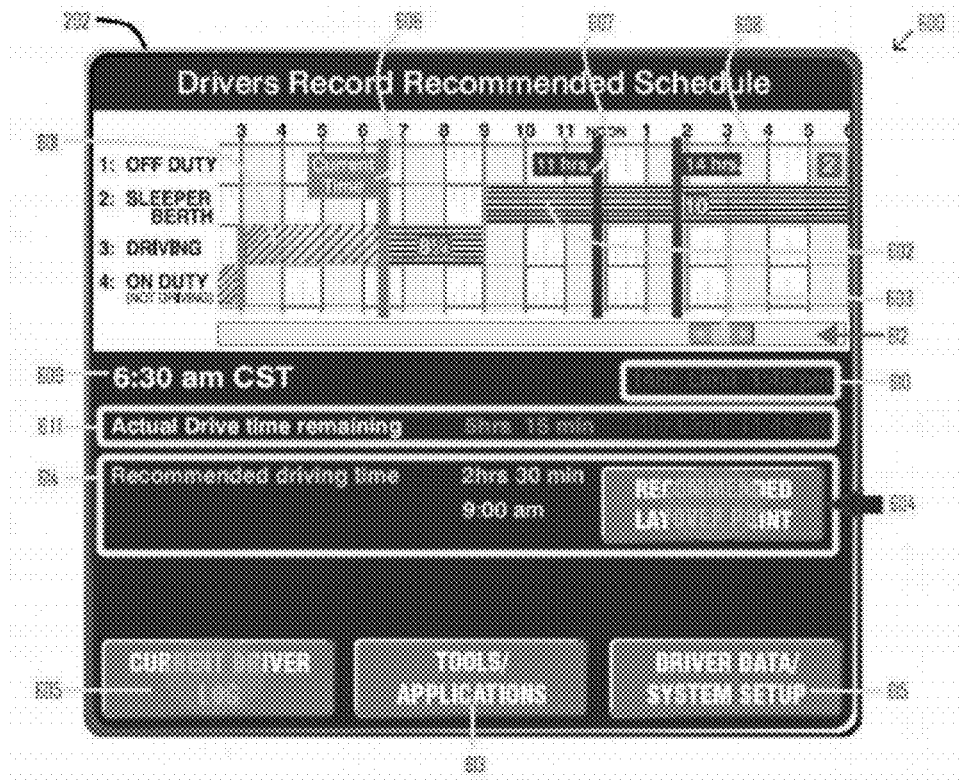
FIGS. 6-7 are exemplary screen captures showing system functionality provided by various embodiments of the present invention.

The system control window 202 may present any combination of driver information and controls. As shown in FIGS. 4 and 6, the system control window 202 may present the driver's record recommended schedule 600, which contains a record log of the driver's prior activities 601 and recommended activities 602 based on the prior activities and any applicable regulations. This driving schedule may include indications of the current time 606, the eleventh hour 607, and fourteenth hour 608.

As shown in FIG. 6, for the driver's record recommended schedule 600, the system control window 202 may present the current time 609, fourteenth-hour limit subwindow 610, actual driving time subwindow 611, recommended driving time subwindow 614, access to the full driver log 605, access to tools and applications 613, and access to custom setup 615. The actual driving time subwindow 611 may present the time remaining to reach the eleventh-hour limit under continuous operation.

Figure 7:
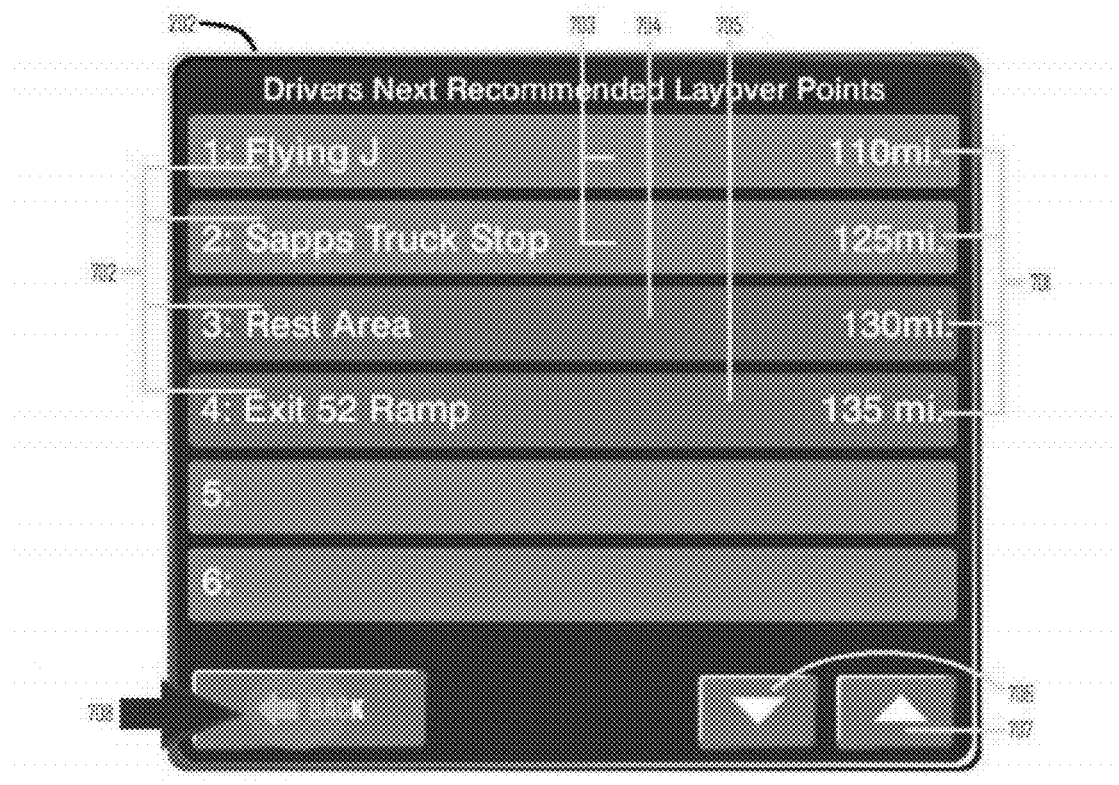

The recommended driving time subwindow 614 may present the recommended time to avoid continuous operation by stopping the drive. The recommendation may include recommended layover points 604 based on the truck operator's preference criteria. The operator's preference criteria may include specific rest areas, gas stations, exit ramps, restaurants, pharmacies, fueling stations, etc. As shown in FIG. 7, the recommended layover points 604 may be presented in a subsequent system control window 202 with a listing of the distance to the recommended layover points 701, names of recommended layover points 702, and color indication of their preference 703-706. The truck operator may scroll through additional recommended layover points using the scroll down arrow 706 and scroll up arrow 707. The truck operator may navigate back 708 to system control window 202 of FIG. 6

The current view of the driver's record recommended schedule 600 may be adjusted to display prior activities 601 and recommended activities 602 by using scrolling functionality of sliding text and/or images across a display. In some embodiments, the scrolling functionality may be accomplished through the use of a scrollbar position 603, scrollbar window 612, scroll arrow keys, page back and page forward keys, or through touch-drag motion.

Figure 8:
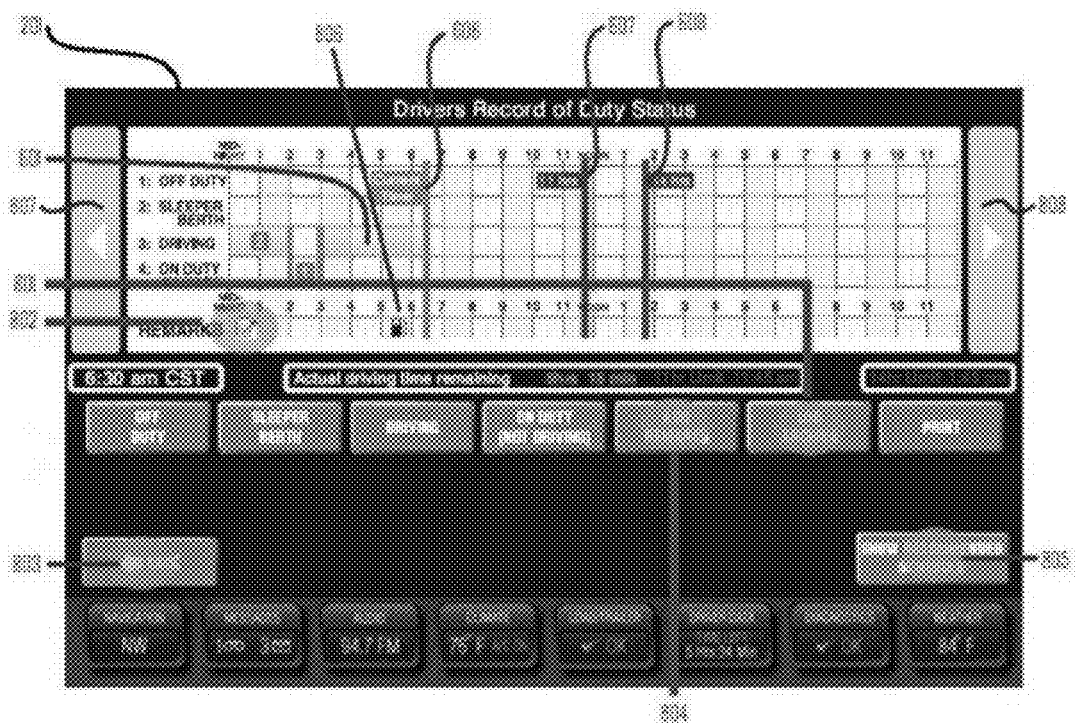
FIGS. 8-13 are exemplary screen captures of the secondary display panel of FIG. 2, the secondary display panel presenting a Driver's Record of Duty Status in accordance with various embodiments of the present invention.

As shown in FIG. 8, the system may provide the truck operator with access to the full driver log 605 by presenting the driver's record of duty status on the secondary display panel 201. In some embodiments, presentation of the driver's record of duty status may require removal of the enhancement elements 205 and 206, and selection inputs 209-216 for available interface modes. With a wider view, the truck operator is able to see his prior activities 601 with the indications for the current time 606, the eleventh hour 607, and fourteenth hour 608 in detail. Additionally, the driver's record of duty status may include a category for remarks 802 on the timeline. For instance, a truck operator may insert a remark to refuel 806 at a specific time. In some embodiments, the infotainment system calculates the recommended time for refuel and/or automatically inserts a remark to refuel 806 in the driver's record of duty status. The system may identify refueling locations, such as on a geographic map, along a route, or in a list, as points of interest. In some embodiments, the truck operator may scroll through the full driver log by using the scroll back arrow key 807 and scroll forward key 808. The truck operator may navigate back 803 to the default contents of the driver data interface mode of FIG. 4.

The system may associate points of interest with a preferred status. For instance, certain refueling locations, weigh points, and rest area points of interest may be preferred by a vehicle operator or a third party (i.e., fleet management system). The system may associate those points of interest with a preferred status if they have been identified by a vehicle operator or a third party. For instance, if a particular chain of refueling locations is identified as preferred for pricing or other reasons, the system may determine routes that route through those preferred refueling locations.

Figure 9:
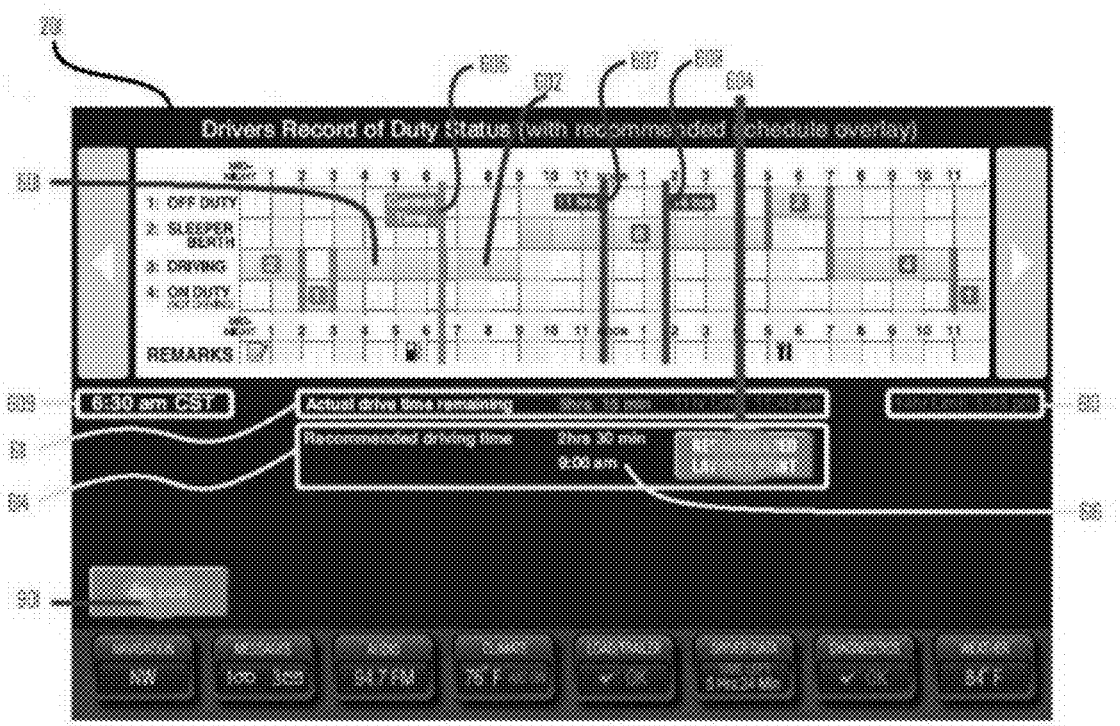

The truck operator may use the recommended schedule input 805 to access a detailed view of both his prior activities 601 and recommended activities 602 overlaid onto the full driver log 605. As shown in FIG. 9, with a wider view, the truck operator is able to see both activities with the indications for the current time 606, the eleventh hour 607, and fourteenth hour 608 in detail. The fourteenth-hour limit subwindow 610, actual driving time subwindow 611, recommended driving time subwindow 614 may also presented. Additionally, the truck operator may have access to the recommended layover points 604 which may be based on the truck operator's preference criteria. The truck operator may navigate back 901 to the full driver log 605 by presenting the driver's record of duty status on the secondary display panel 201 of FIG. 8.

Figure 10:
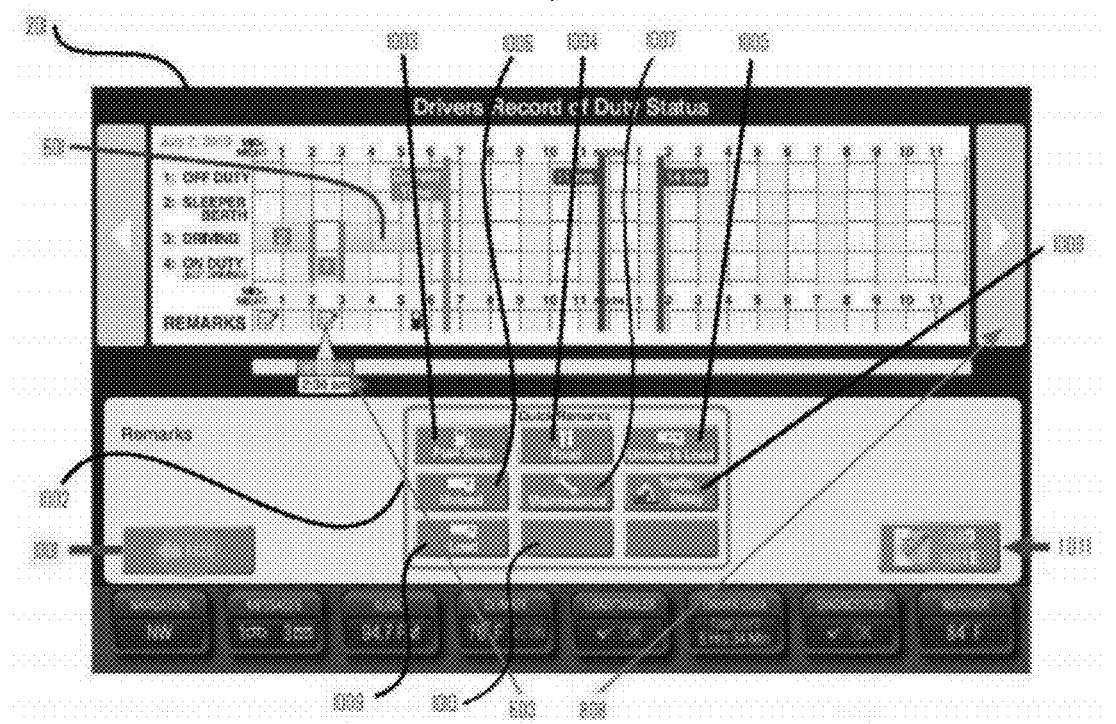

The truck operator may use the add remarks input 804 of FIG. 8 to access a remarks view containing quick remarks 1002, as shown in FIG. 10. The quick remarks 1002 functionality allows the truck operator to quickly add a stored remark that has an associated icon to the remarks category. For instance, the truck operator may quickly add a fuel stop 1003, food stop 1004, unload and load 1005, unload only 1006, maintenance 1007, traffic delay 1008, and load only 1009 to his full driver log 605. In some embodiments, the truck operator may quickly assign stored remarks to an unused quick remark 1010. The truck operator may navigate back 1001 to the full driver log 605 by presenting the driver's record of duty status on the secondary display panel 201 of FIG. 8.

Figure 11:
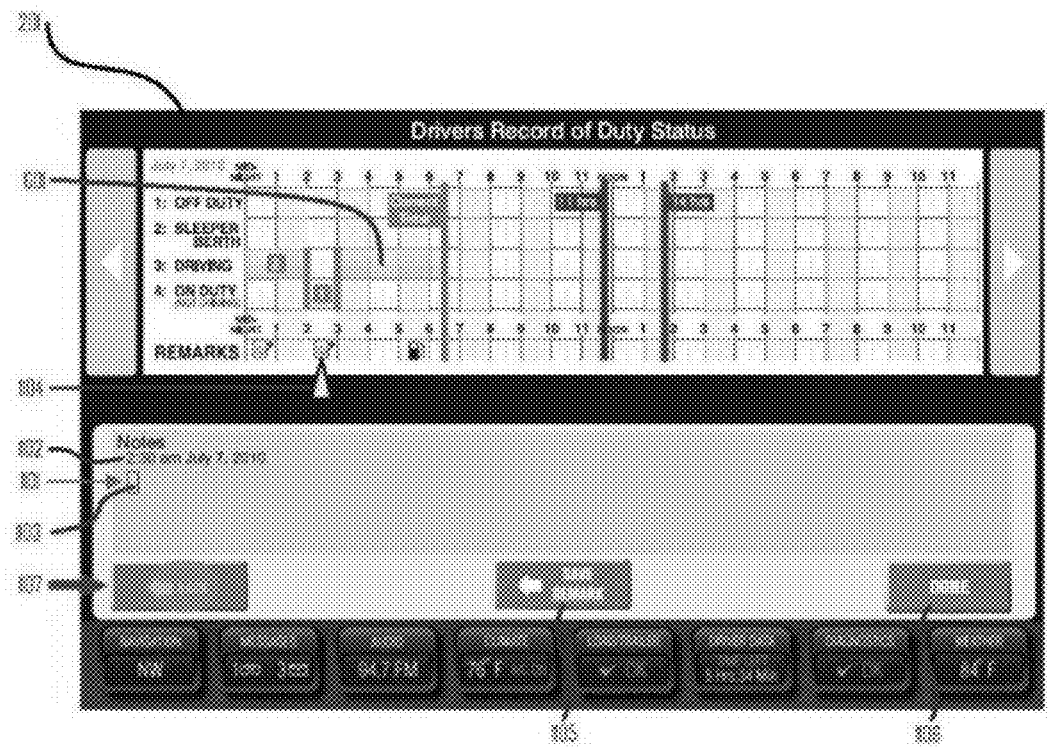

As shown in FIG. 11, the truck operator may use the add note input 1011 to access a notes view to write a custom note in the notes window 1101. A note may be entered by the operator at the text entry cursor 1104 using any input method available to the system. Once the system has received some input to the text entry cursor 1104, the operator may save the progress of the remark using the save remark input 1105. The operator may use the done input 1106 to save the remark after inputting text into the notes window 1101. The system may store the remark on storage hardware located on the truck after the infotainment system receives a save remark input 1105. In some embodiments, the data may be wirelessly transmitted to a remote server or storage location. The infotainment system will create and present a note icon 1104 for the newly created note in the full driver log 605 using the presented date and time 1102.

As shown in FIG. 11, a note created with the date and time 1102 of Jul. 7, 2010, at 2:30 am, will be presented in the full driver log 605 using a note icon 1104 at Jul. 7, 2010, at 2:30 am. In some embodiments, the note icon 1104 may be created and presented for notes while they are still in progress and incomplete. An incomplete note icon 1104 presented in the full driver log 605 may be presented in a manner to distinguish it from a completed note icon 1104. For instance, the incomplete note icon 1104 may be presented in a lighted shade, bold, different color, a combination of the preceding, or any manner used to distinguish between the status of note icons 1104. The operator may navigate back 1107 to the remarks view on the secondary display panel 201 of FIG. 10.

Figure 12:
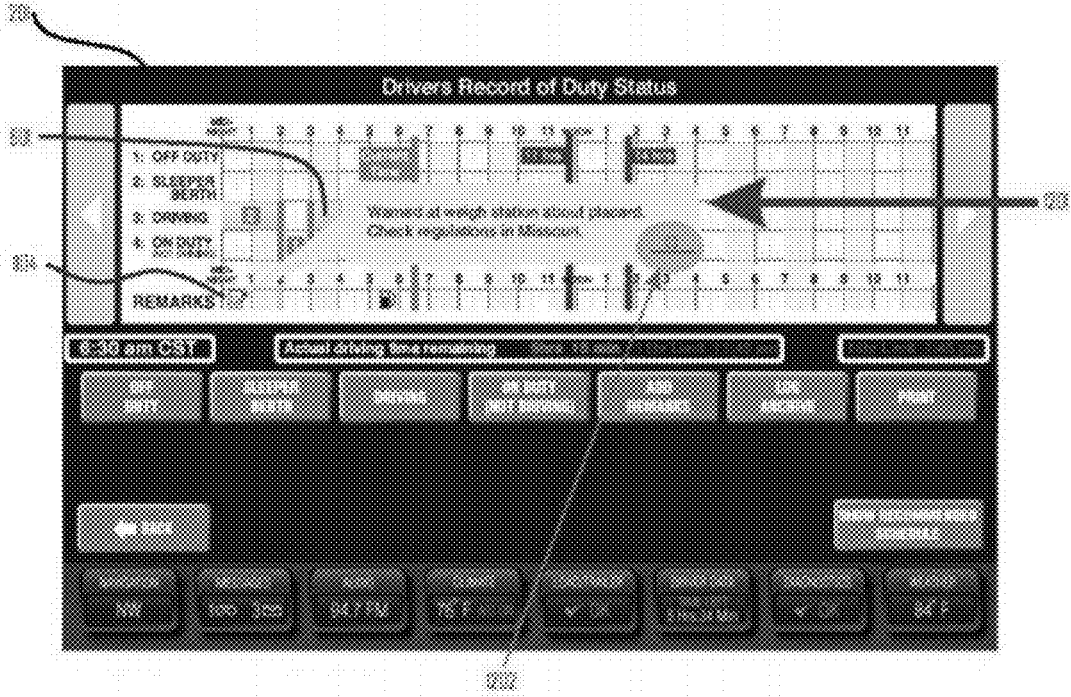

As shown in FIG. 12, the truck operator may access the contents of a presented note icon 1104 within the driver's record of duty status window. The contents may be presented using a note presentation 1201 within full driver log 605. The displayed note presentation 1201 may be closed by touching the note presentation 1201 or a close note presentation input. In some embodiments, the contents may be presented on the primary display panel 101. For instance, the contents may be presented in the information center display 102. Also, the truck operator may use the compose message icon 1202 to compose an electronic message containing the contents of the presented note icon 1104. The truck operator may be prompted to select the electronic message type after selecting the compose message icon 1202. In some embodiments, the electronic message type may comprise of email, text message, instant message, electronic journal message, social network website, and fleet network.

Figure 13:
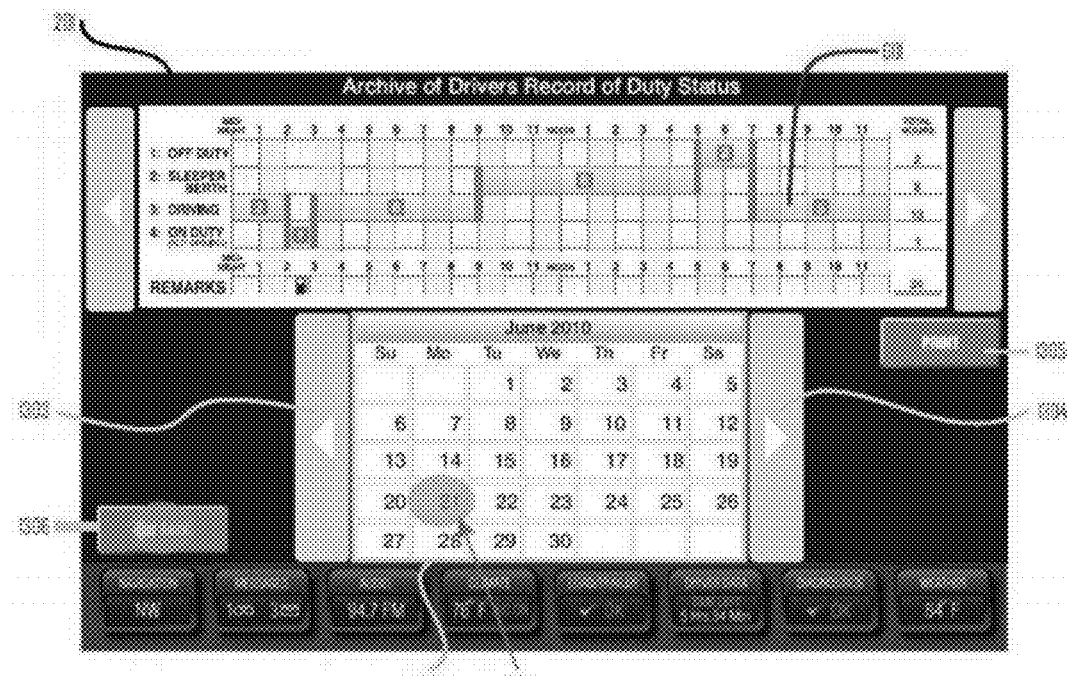

The truck operator may access a calendar to view the full driver log 605 for days in the past. As shown in FIG. 8, this may be accomplished using the log archive input 801. As shown in FIG. 13, the archive of driver's record of duty status may present the truck operator with prior activities 601, a calendar date selection input 1301, and archive printing input 1305. The vehicle operator may select the date for which the operator wants to view archived data. For instance, the truck operator may select a calendar day by touching a day 1302 in the calendar date selection input 1301. The truck operator may view other months by using the prior month input 1303 and next month input 1304. The truck operator may navigate back 1306 to the full driver log 605 by presenting the driver's record of duty status on the secondary display panel 201 of FIG. 8.

Secondary Display Panel—Trailer Interface Mode

Figure 5:
FIG. 5 is an exemplary screen capture of the secondary display panel of FIG. 2, the secondary display panel presenting load/trailer controls within the center region.

As shown in FIG. 5, the secondary display panel 201 may be used in a trailer interface mode to provide present important information for one or more cargo trailers attached to the vehicle. While the secondary display panel 201 is in the trailer interface mode, the presented contents may include one or more system control windows 202, enhancement elements 205, 206, and selection inputs for available interface modes.

The presented contents of the system control window 202 may include cargo trailer information, cargo control, access to cargo trailer equipment, and access to trailer load details. As shown in FIG. 5, the presented cargo trailer information may include may include any combination of sensors and gauges 401, cargo trailer climate control modules for one or more cargo trailer zones 402 and 403, rear view camera selection input 408 to access one or more cameras mounted to give the truck operator views for the rear of the cargo trailer, future load details 404, active load details 405, load archive details 406, and a reference and documents details 407.

The system uses future load details 404 to provide functionality for the operator to search for and schedule loads that are available for pickup and delivery. The system may calculate how available loads will impact the operator's driving schedule. In some embodiments, the system will evaluate the current vehicle location, load site, cost of arriving at the load site (i.e., fuel, tolls, and wear and tear), and the overall impact to currently scheduled events that would result from picking up the available load. In some embodiments, the system will provide and evaluate trailer information, such as current and projected trailer weight and/or capacity, to assist the operator in determining whether it is efficient to pick up the available load. In some embodiments, the system will provide load payment information related to the cost, compensation, and/or profit that would be received by the vehicle operator, owner, and/or third parties as a result of picking up the available load.

In some embodiments, the system may determine the suitability of a load based on financial factors (e.g., payment amount, transport cost, profit, labor hours, insurance coverage, etc.) and/or proximity to a route, current location, or anticipated loading and/or unloading locations. The vehicle operator or third party may identify financial factors that should be satisfied for available loads and the distance away from a current route or location that should be considered for transport. For instance, if system identifies $1000 as the minimum payment amount, $250 as the minimum profit, and 10 miles as the proximity to the route, the system may only recommend available loads that fit these suitability criteria. Available loads that are more than 10 miles from any point along the route or that do not provide at least $250 as the projected profit would not meet the suitability criteria. In some embodiments, the system may rank available loads based on the suitability criteria. The system may limit its ranking to loads that meet the criteria or indicate preference to those loads while still presenting all available loads. Preference may be indicated by an order list ranking all loads or by using varying indicators on a geographic map (e.g., colors, symbols, etc).

The truck operator may customize the sensors and gauges 401 presented in the system control window 202. In some embodiments, the sensors and gauges available for selection may include those directly related to one or more cargo trailers.

The truck operator may access a cargo trailer climate control window for the attached cargo trailers. The infotainment system allows the driver to divide the cargo trailer area into separate climate control environments. In some embodiments, the temperature control modules 402 and 403 contain current temperature readings for cargo trailer zones 408 and 409.

The truck operator may access one or more cameras giving the view for the rear of the cargo trailer by providing an input control command to the rear view camera selection input 408. The rear view camera selection input 408 may present the truck operator with an option to select the feed from one or more cameras for presentation. The camera selection list may be in the format of a list or thumbnails. In some embodiments, the selected camera feeds may fill the entire secondary display panel 201. The available camera feeds may include night vision and/or infrared feeds.

The operator may access detailed information on the active load by using the active load details 405, planned loads by using the future load details 404, and saved loads by using the load archive details 406. Also, the operator may access any stored materials by using the reference and documents details 407. The accessed information may be stored locally or remotely. In some embodiments, the information may be accessed and modified by third parties. For instance, a fleet management system may submit data on a remote server for one or more operators in the fleet to access. This data may include, but is not limited to, updates on weather, business information, employee forms, etc.

Secondary Display Panel—Navigation Interface Mode

The secondary display panel 201 may be used in a navigation interface mode to provide an interface mode for accessing navigation information. The navigation functionality provided by the system may use the location determining component to assist the operator. While the secondary display panel 201 is in the navigation interface mode, the presented contents may include one or more system control windows 202, enhancement elements 205, 206, and selection inputs for available interface modes.

The system, which includes the location determining component, may utilize position-determining techniques such as the Global Position System (GPS) and/or other satellite and terrestrial locating systems. In this manner, the location of the system may be identified to enable the system to provide various location and navigation functionality. In various configurations, the system may include a GPS enabled device that includes a receiver that is configured to receive the signals via an antenna from various position-transmitting sources.

Global Positioning Systems (GPS) have been developed to provide accurate positioning data. In traditional GPS systems, a receiver is used to capture input signals to identify a location of the receiver with respect to one or more GPS signal sources, such as satellites. In this manner, a device including the receiver may be used to navigate from the identified location to a designated location.

When the device is provided with a library of roadways (such as streets, avenues, boulevards, paths, highways, expressways, alleys, trails) the device may be capable of indicating a route between the identified and designated locations. For example, upon accepting an end point, the device may access a library containing roadway data to indicate which roadways may be used to reach the designated location.

The presented contents of the system control window 202 may include current position information and scheduling information that may be reviewed in the Driver Data Interface mode. The presented position information may include may include any combination of position-determining functionality, for purposes of the following discussion, may relate to a variety of different navigation techniques and other techniques that may be supported by "knowing" one or more locations. For instance, position-determining functionality may be employed to provide location data, timing data, speed data, and a variety of other navigation-related data. The system may be configured in a variety of ways to perform a wide variety of navigation related functions. For instance, the system may be configured for vehicle navigation as illustrated, aerial navigation (e.g., for airplanes, helicopters), marine navigation, personal use (e.g., as a part of fitness-related equipment), and so forth. Accordingly, the system may include a variety of devices to determine the position of the system using one or more of the techniques previously described.

The signals from various position-transmitting platforms may be processed by a navigation module, which may be executed by the system's processor and stored within the system's memory. The navigation module is representative of functionality that "knows" a location, such as by processing the signals obtained from the position-transmitting platforms to provide the position-determining functionality previously described, such as to locate the system, speed, time, and so forth. The navigation module, for instance, may be executed to use position data stored in the memory to show a current position on a map, and so on. The navigation module may also be executed to provide other position-determining functionality, such as to determine a current speed, calculate an arrival time, and so on. A wide variety of other examples are also contemplated.

The system may also include a routing module. The routing module is representative of functionality to determine a suitable route between two locations. The routing module may use cartographic data to determine the shortest, fastest, and/or most fuel economical route between two locations. The cartographic data may be stored within the memory and/or acquired from a remote service via one or more communication elements.

While a GPS system is described in this document, it should be apparent that a wide variety of other positioning systems may also be used, such as terrestrial based systems (e.g., wireless-telephony systems or data systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros or odometers), and so on. Other exemplary systems include, but are not limited to, a Global Orbiting Navigation Satellite System (GLONASS), a Galileo navigation system, or other satellite navigation system.

Secondary Display—Messaging Interface Mode

The secondary display panel 201 may be used to provide a messaging interface mode for accessing messaging and communication information. While the secondary display panel 201 is in the messaging interface mode, the presented contents may include one or more system control windows 202, enhancement elements 205 and 206, and selection inputs for available interface modes.

The system control window 202 may present any combination of driver information and applications. For instance, the system control window 202 may present the driver's voicemail, email, text message, instant message, electronic journal message, social network website, and fleet network information. The infotainment system may handle the reception and transmission of any type of electronic messaging format.

Secondary Display Panel—Diagnostics Interface Mode

The secondary display panel 201 may be used to provide a diagnostics interface mode for presenting any diagnostic information for the vehicle and/or cargo trailer. While the secondary display panel 201 is in the diagnostics interface mode, the presented contents may include one or more system control windows 202, enhancement elements 205, 206, and selection inputs for available interface modes.

The system control window 202 may present diagnostic warning indicators 103 and sensor reading information. The sensors presented in the system control window 202 may be customized by the truck operator. The sensor reading information may include current reading and archived historical readings. In some embodiments, the diagnostic information may also be automatically communicated to one or more third parties, such as fleet management systems, towing service providers, and repair service providers. Remote computing devices of third parties may be notified of a current status of system components using wireless communication. Repair services providers benefit from vehicle status information by being made aware of relevant vehicle problems.

Figure 23:
Figure 24:
Figure 25:
Figure 26:

As shown in FIGS. 17-30, one or more embodiments of the system present a range of diagnostic information for the truck and trailer. As shown in FIGS. 23 and 24, the system is capable of presenting information for nearby service centers. In some embodiments, the system may comprise functionality which provides routing information for the truck operator to navigate to a selected service center by using the routing module. The system may provide this functionality at any time. For instance, the system may present service center information operator immediately after a diagnostic fault is presented or upon the user input. As shown in FIG. 24, the system may report the diagnostic fault and vehicle identification number (VIN) to the selected service center.

In some embodiments, the truck operator may monitor and control transportation and performance features of the truck and cargo trailer from the system control window 202. The adjustment may be made using electronic switches that receive the touchscreen input. For instance, the truck operator may adjust the commonly used light switches, such as those required for lights, running lights, fog lights, outdoor cab light, gauge dim lights, hazard lights, outside beacon light, auxiliary running lights, truck sleeper lights, rear air conditioning, and rear lights. Also, the truck operator may adjust performance related components, such as engine fan, engine brake, DPF emission, cruise control, and cruise select. Additionally, the truck operator may also adjust critical truck and cargo trailer settings, such as the height and/or firmness of the trailer air suspension, truck air suspension, locking and/or unlocking of the fifth wheel, and the locking and/or unlocking of the differential.

Figure 27:
Figure 28:

As shown in FIGS. 25-28, the system is operable to manage and present trip, maintenance, jurisdiction, and fuel management information for analysis. The system may provide functionality permitting custom configuration of the management information. In some embodiments, as shown in FIG. 27, the regulations based on a jurisdiction are available for review and compliance checks. In some embodiments, the selected jurisdiction may be selected by the truck operator or automatically adjusted based on the current location of the truck as determined by the location determining component. This management information may be presented in any format. For instance, as shown in FIG. 28, the management information may be presented in the format of a chart.

In some embodiments, the system may provide functionality determining the total distance traveled in each territory by the vehicle. The area traveled may be divided into territories such as countries, states, counties, etc. The truck may determine the total distance traveled in a territory by determining the distance traveled from the point at which the truck entered the territory and the point at which the truck exited the territory. The territorial travel information may be prompted to the truck operator immediately upon crossing territory lines or in a travel summary. In some embodiments, this functionality may be made available to the truck operator, third parties, or regulation and/or governmental entities. This functionality may be linked to a routing module and/or location determining component.

Secondary Display Panel—Weather Interface Mode

The secondary display panel 201 may be used to provide a weather interface mode for accessing weather data. While the secondary display panel 201 is in the weather interface mode, the presented contents may include one or more system control windows 202, enhancement elements 205 and 206, and selection inputs for available interface modes. The system receives weather and weather-related data using the available methods the system uses to obtain information.

In some embodiments, weather sensors may be installed on the truck to complement received weather data or to provide redundancy. In some embodiments, the local sensors are used to validate received weather data.

The system control window 202 may present any combination of weather information and weather-based applications. Weather information may include radar and/or satellite images in combination with other weather enhancing information. For instance, the weather enhancing information may comprise, among other information, current temperature, heat index, wind chill, humidity, dew point, wind data, visibility information, fronts, precipitation information, and snow depth.

Weather-based applications may include projected travel delays based on the infotainment system's forecasted weather. In some embodiments, the weather-based anticipated delays may be factored into the driving schedule in the Driver's Data Interface.

Supplemental Display Panels

The system may use supplemental display panels 1401 to present any information to the operator or receive touch input control commands from the operator. In some embodiments, the content available for presentation on the supplemental display panels 1401 is linked to the information displayed on the primary display panel 101 and/or secondary display panel 201.

In some embodiments, the truck operator may control transportation and performance features of the truck and trailer from a single supplemental display panel 1401. The supplemental display panel 1401 may allow functionality to receive an input control command using a touchscreen. The adjustment of features may be made using electrical switches presented for adjustment on a supplemental display panel 1401 that receive the operator's touch input. This adjustment method may be used to control any switch. For instance, the system may provide functionality for the operator to adjust commonly used light switches, such as those required for lights, running lights, fog lights, outdoor cab light, gauge dim lights, hazard lights, outside beacon light, auxiliary running lights, truck sleeper lights, rear air conditioning, and rear lights.

In some embodiments, the truck operator may adjust performance related components, such as engine fan, engine brake, DPF emission, cruise control, and cruise select. Additionally, the truck operator may also adjust critical truck and cargo trailer settings, such as the height and/or firmness of the trailer air suspension, truck air suspension, locking and/or unlocking of the fifth wheel, and the locking and/or unlocking of the differential.

Although the present invention has been described with exemplary embodiments, it should be understood that various changes, substitutions, and modifications may be made by one skilled in the art without departing from the spirit and the scope of the present invention.

Fuel Management

The infotainment system may calculate the recommended time for refuel and/or automatically insert a remark to refuel 806 in the driver's record of duty status. In some embodiments, the routing module may be used to calculate the recommended time for refueling. For example, the routing module may use cartographic data to determine the shortest, fastest, and/or most fuel economical route between two locations. In some embodiments, the shortest, fastest, and/or most fuel economical route may be determined remotely.

The system may use a plurality of criteria to determine the fuel efficiency of one or more proposed routes and/or loads. For example, the criteria may comprise one or more remarks to refuel 806 into its determinations involving fuel management. The remarks to refuel 806 may be inputted by the truck operator or the system based on a recommended time for refueling. In some embodiments, the criteria may include projected changes in the weight of the truck (e.g., curb weight, load weight, freight weight, fuel weight, etc). For instance, a truck operator may make multiple stops adding and/or dropping loads. This variation in weight may be taken into account by the system to project distance that may be traveled using various amounts of fuel, fuel costs, available loads, and the profitability and/or efficiency of current loads. In some embodiments, the criteria may include real-time fuel prices.

In some embodiments, data related to fuel management may be accessible by or provided to remote computing devices of third parties. For example, a truck management company may remotely monitor the truck's fuel efficiency, projected fuel costs, and other fuel related information.

In some embodiments, the system may indicate the impact of the current fuel economy and the financial information regarding the load (i.e., projected fuel costs, load costs, and load profits). For example, if the current fuel economy increases from 10 miles per gallon (mpg) to 15 mpg, the system may communicate to the truck operator that the projected total cost of fuel for the total trip has decreased by 5%. Alternatively, the system may communicate to the driver that the scheduled time for refueling may be delayed.

Figure 29:
Figure 30:
Figure 31:
FIGS. 31-39 are exemplary screen captures of the secondary display panel of FIG. 2, the secondary display panel presenting load/trailer active load controls within the center region.
Figure 32:
Figure 33:
Figure 34:
Figure 35:
Figure 36:
Figure 37:
Figure 38:
Figure 39:
Figure 40:
FIGS. 40-42 are exemplary screen captures of the secondary display panel of FIG. 2, the secondary display panel presenting load/trailer future load controls within the center region.
Figure 41:
Figure 42:
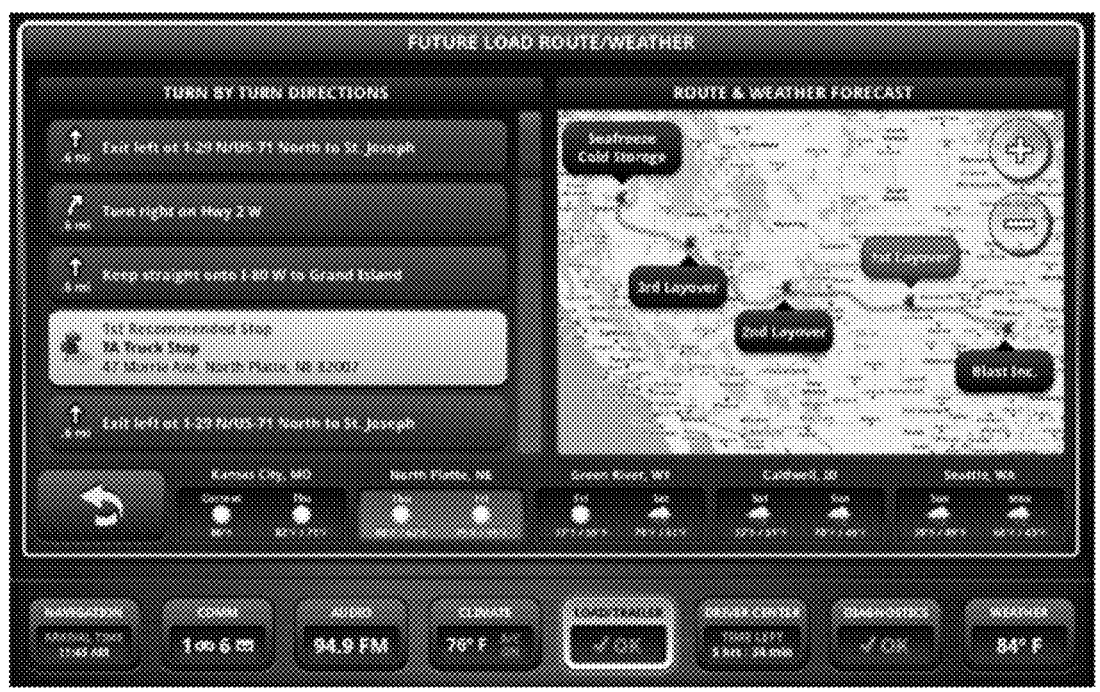
Figure 43:
FIGS. 43-55 are exemplary screen captures of the secondary display panel of FIG. 2, the secondary display panel presenting communication controls within the center region.
Figure 44:
Figure 45:
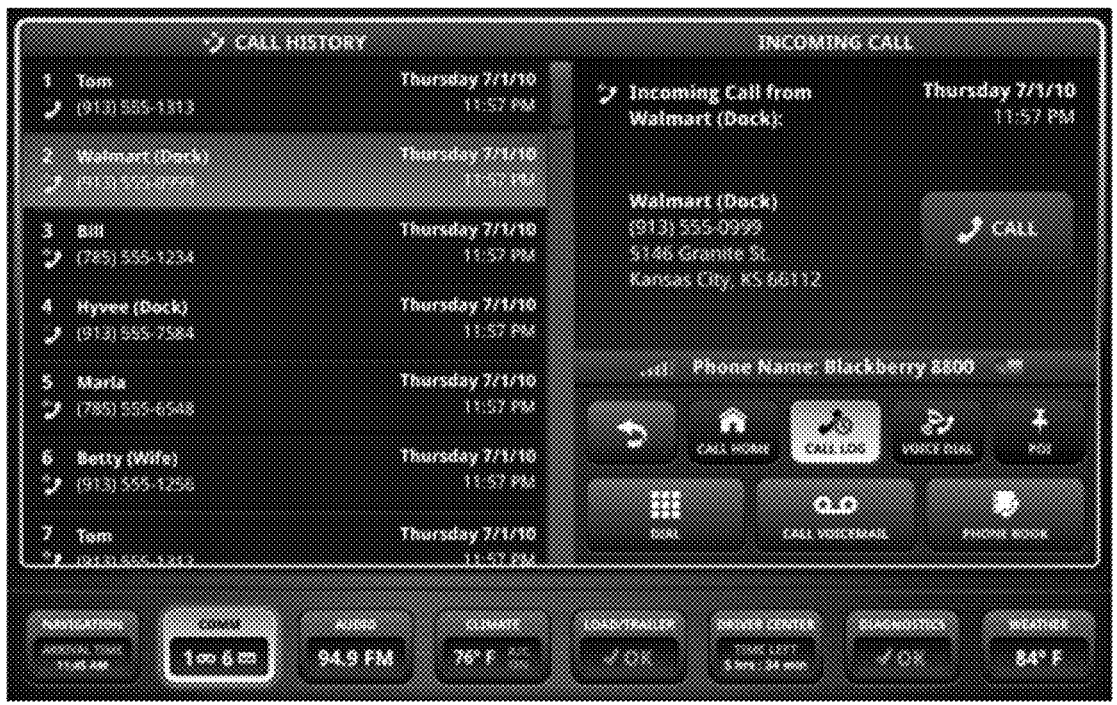
Figure 46:
Figure 47:
Figure 48:
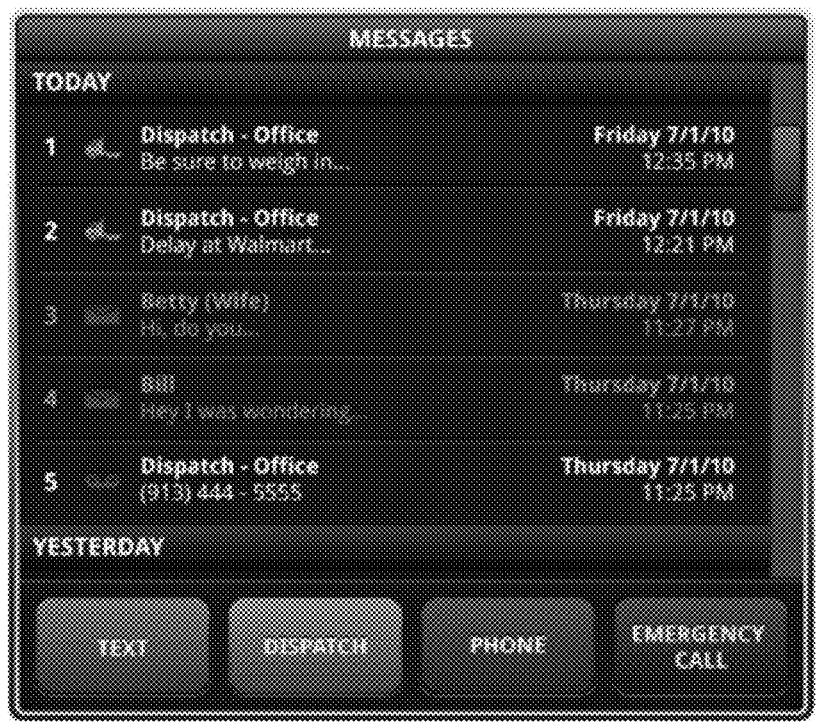
Figure 49:
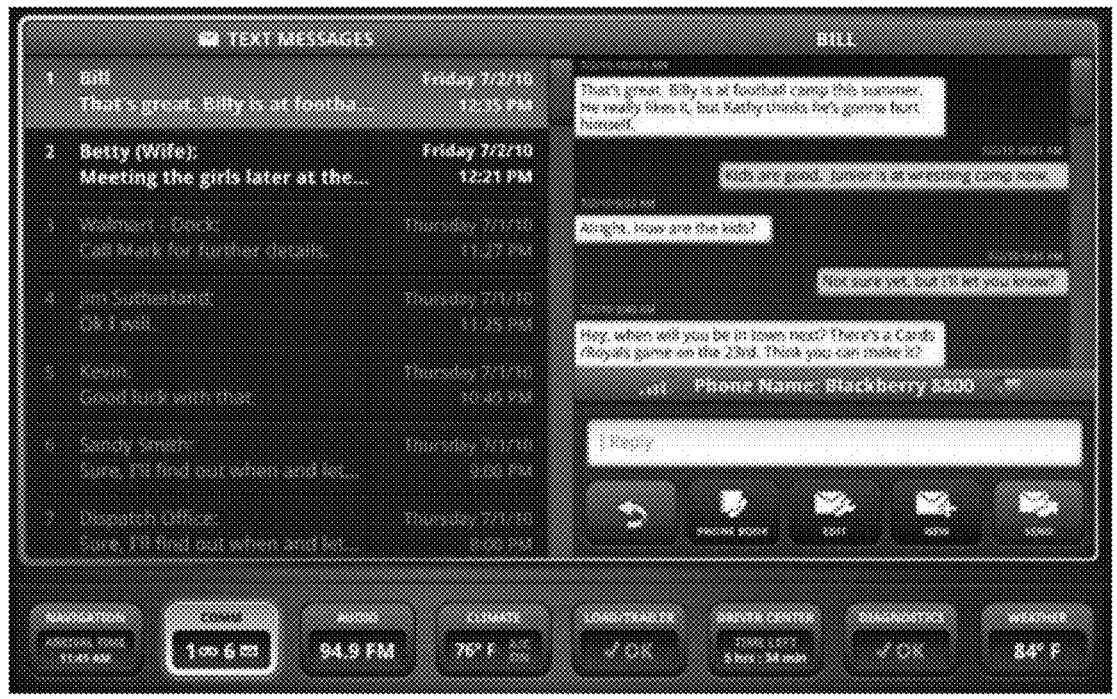
Figure 50:
Figure 51:
Figure 52:
Figure 53:
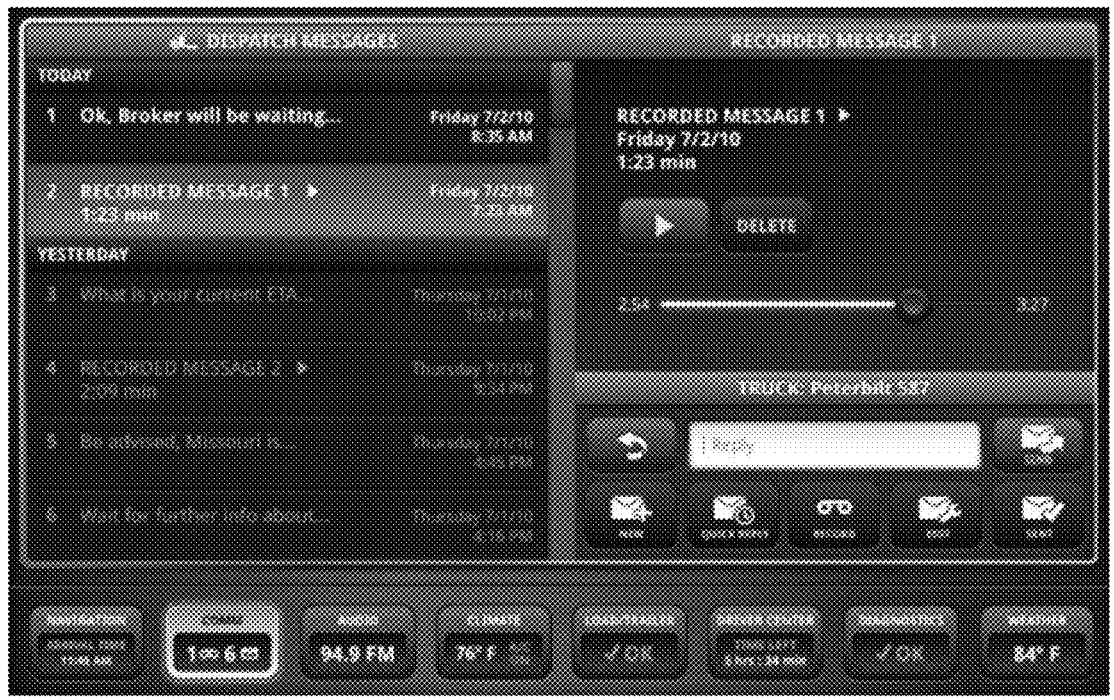
Figure 54:
Figure 55:
Figure 56:
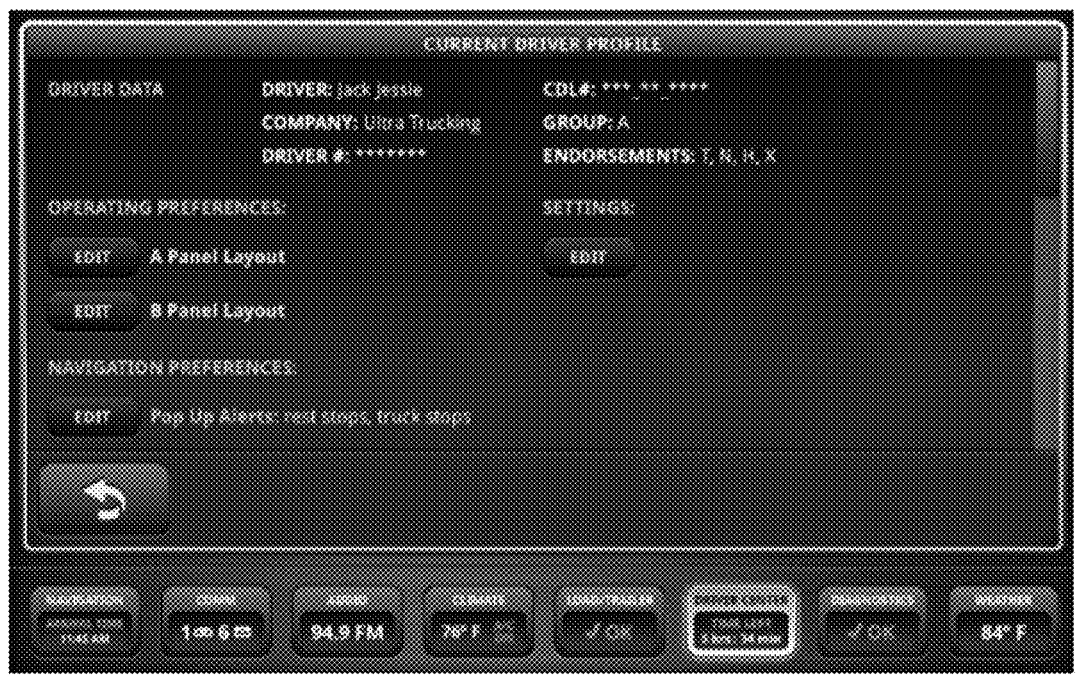
FIGS. 56-58 are exemplary screen captures of the secondary display panel of FIG. 2, the secondary display panel presenting driver data controls within the center region.
Figure 57:
Figure 58:
Figure 59:
FIGS. 59-60 are exemplary screen captures showing system access, tools, and application functionality provided by various embodiments of the present invention.
Figure 60:
Figure 61:
FIGS. 61-73 are exemplary screen captures of the secondary display panel of FIG. 2, the secondary display panel presenting navigation controls within the center region.
Figure 62:
Figure 63:
Figure 64:
Figure 65:
Figure 66:
Figure 67:
Figure 68:
Figure 69:
Figure 70:
Figure 71:
Figure 72:
Figure 73:
Figure 74:
FIGS. 74-96 are exemplary screen captures of the information center display provided by various embodiments of the present invention.
Figure 75:
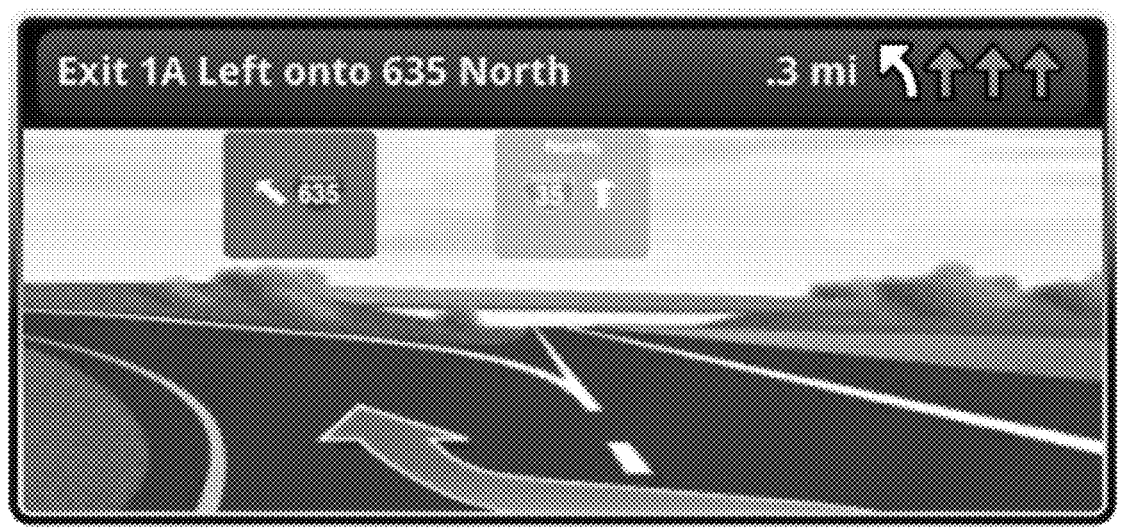
Figure 76:
Figure 77:
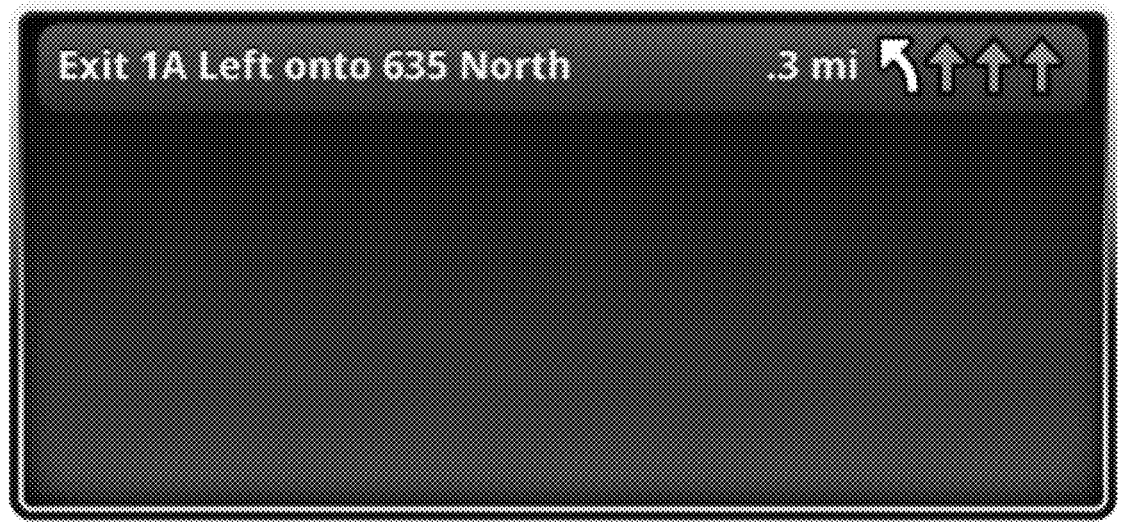
Figure 78:
Figure 79:
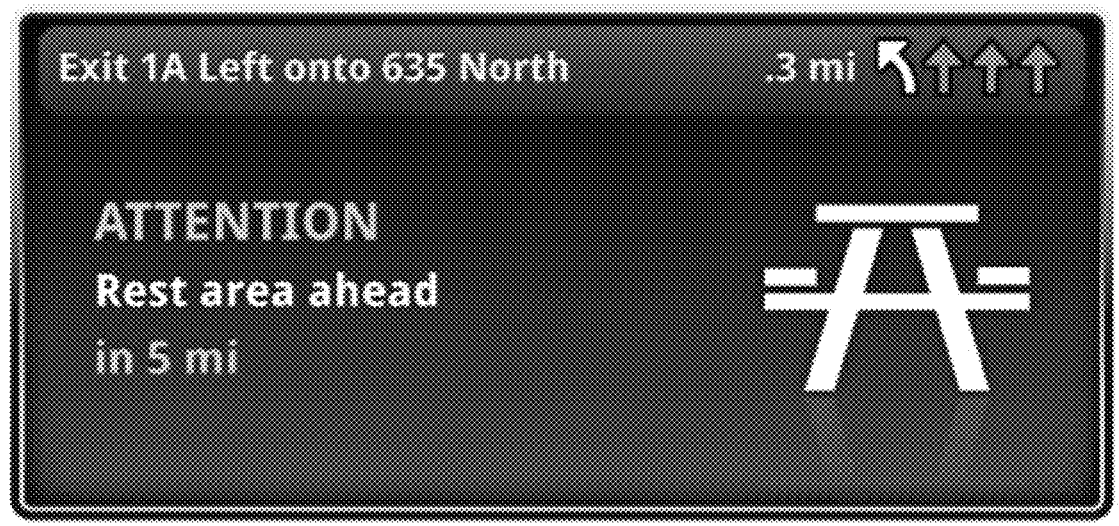
Figure 80:
Figure 81:
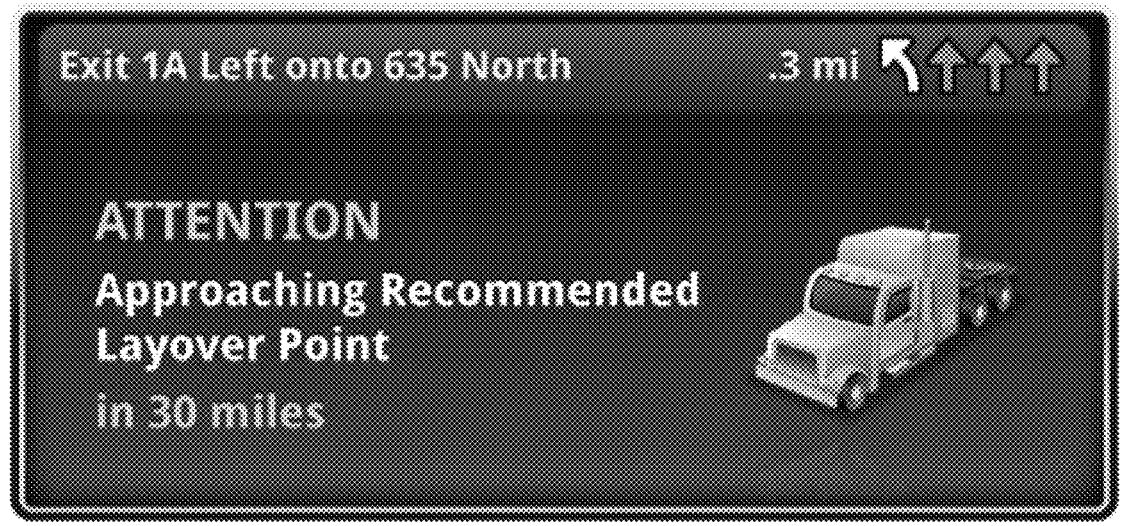
Figure 82:
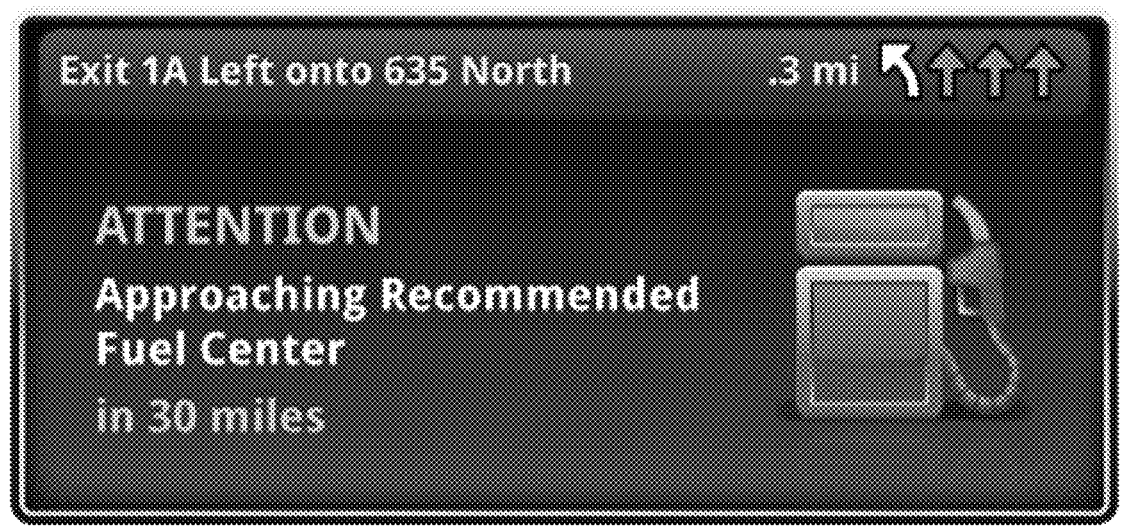
Figure 83:
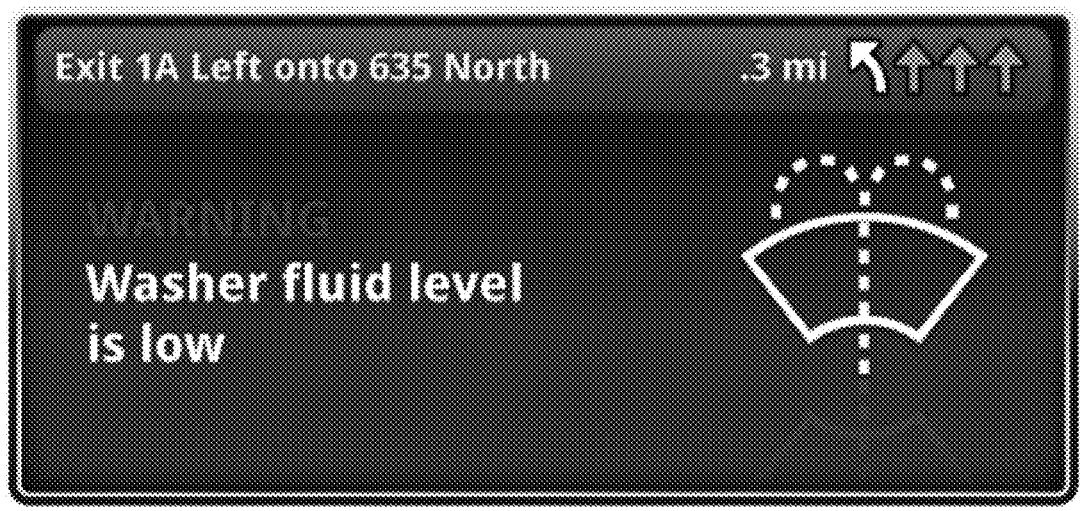
Figure 84:
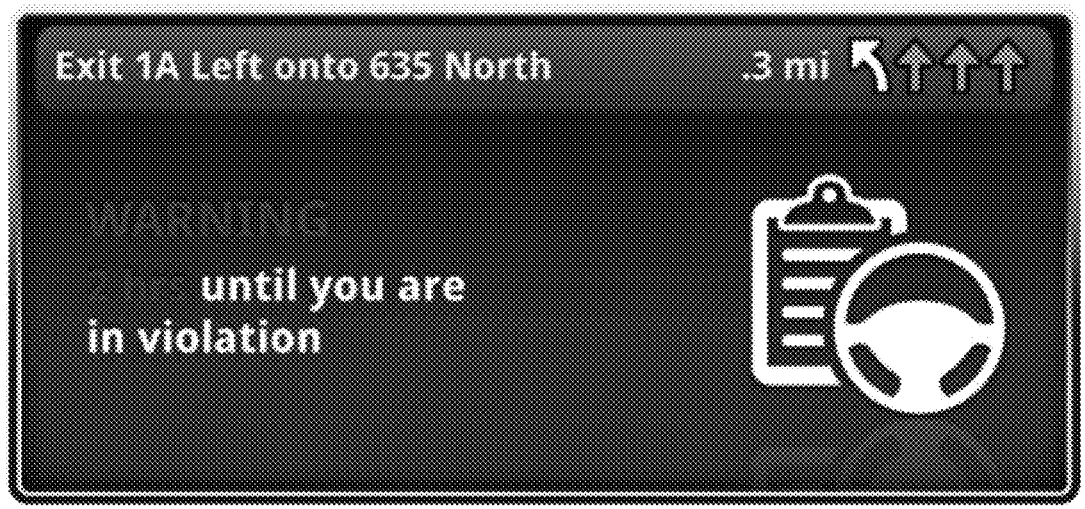
Figure 85:
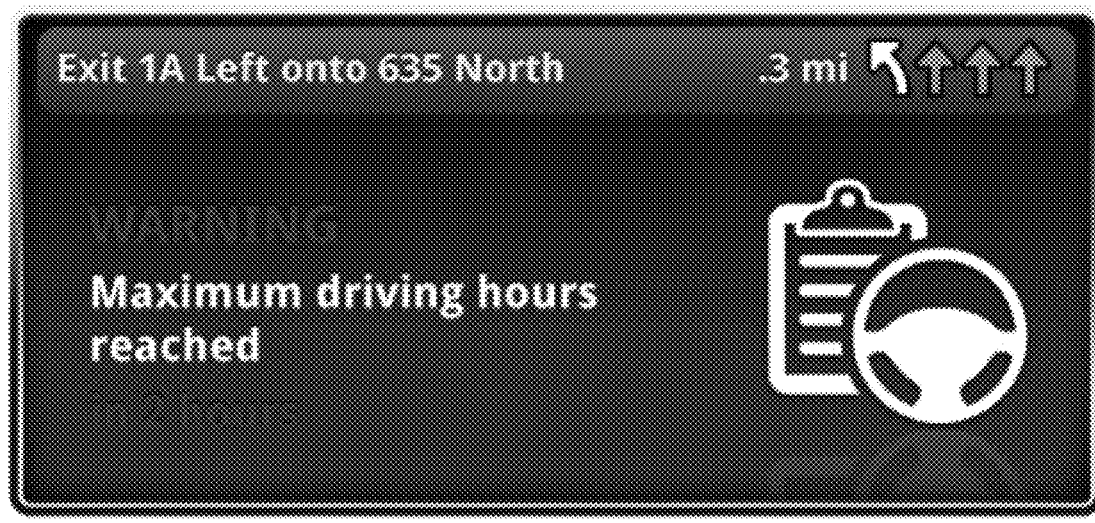
Figure 86:
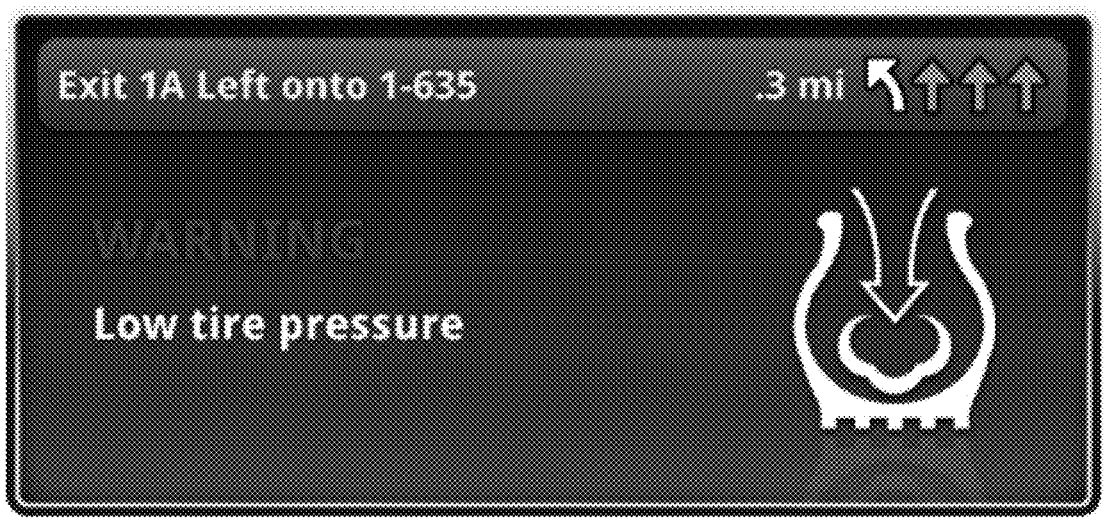
Figure 87:
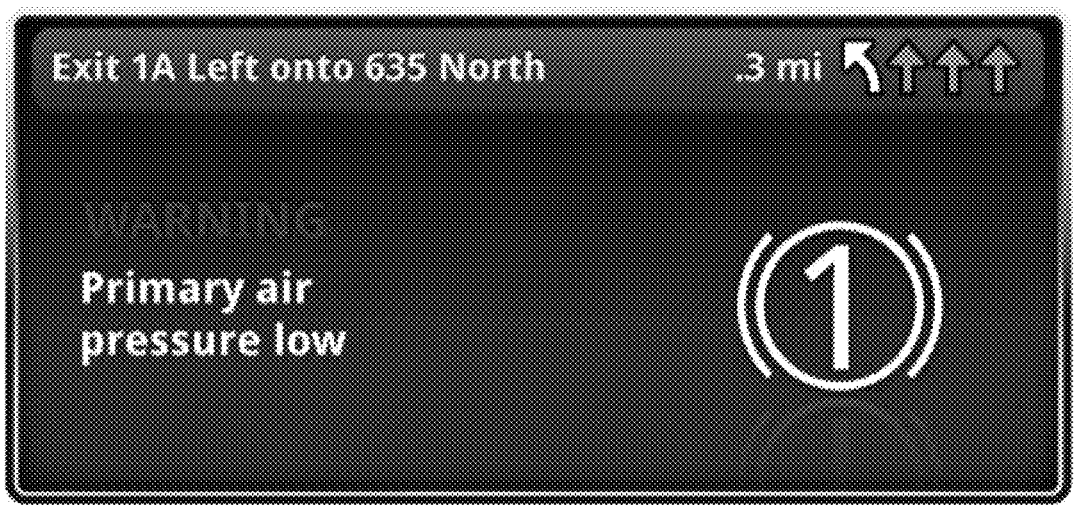
Figure 88:
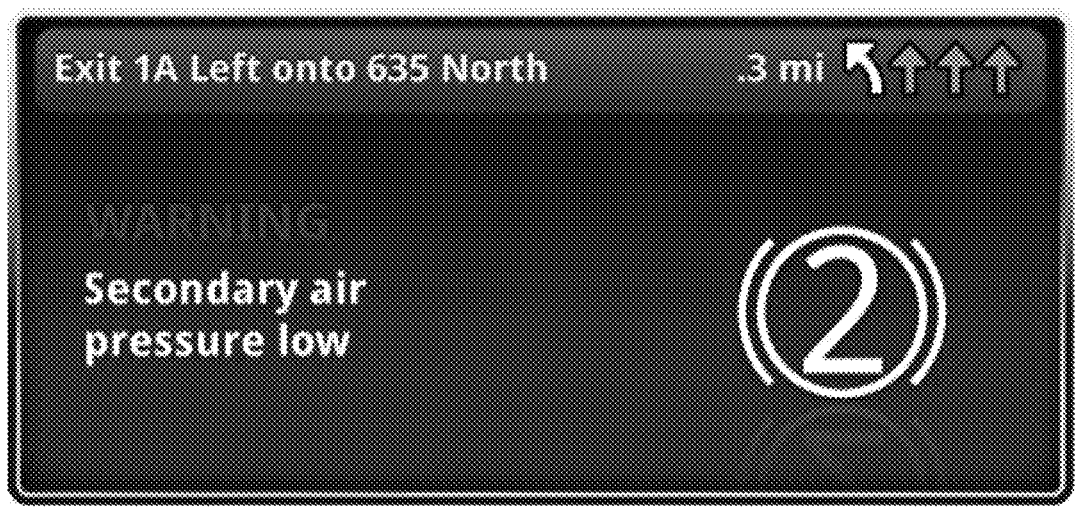
Figure 89:
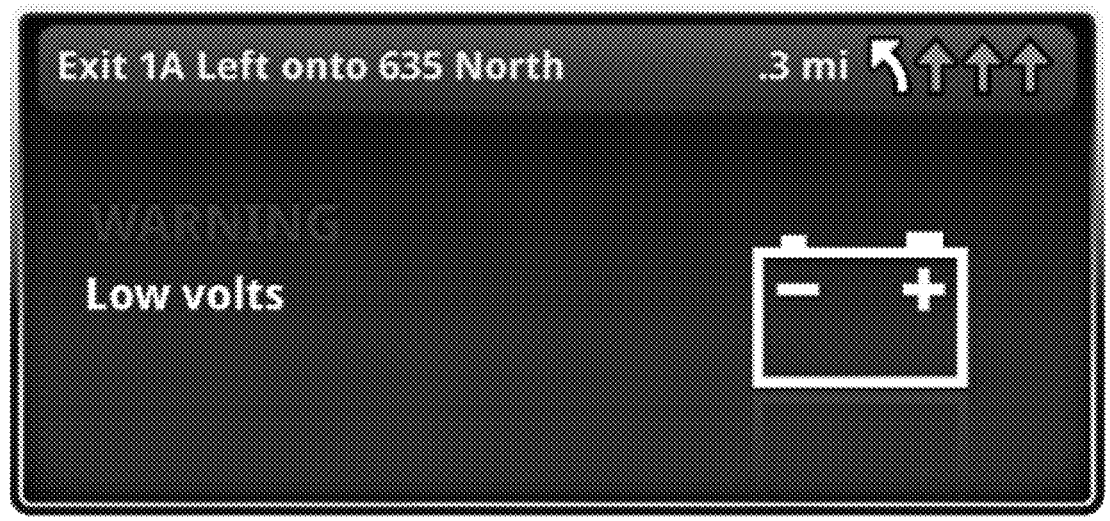
Figure 90:
Figure 91:
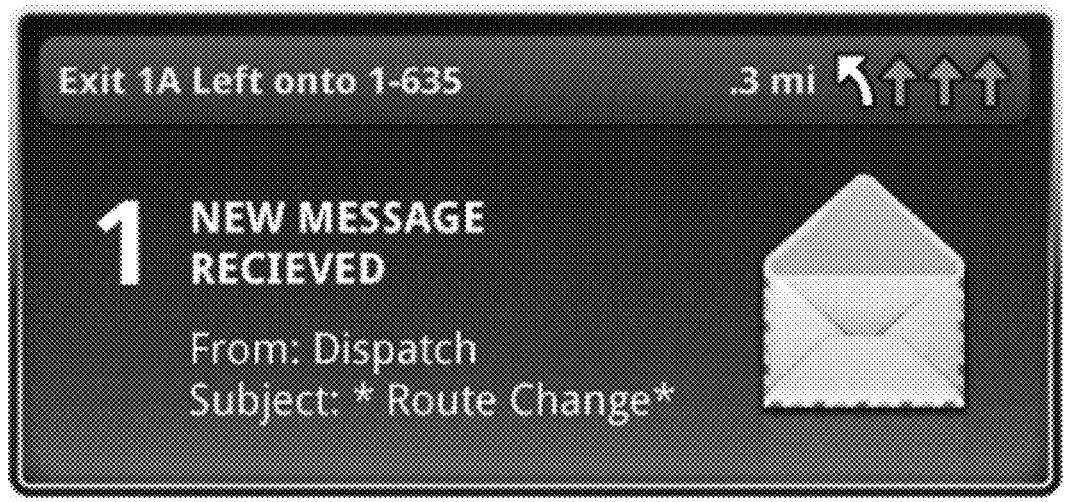
Figure 92:
Figure 93:
Figure 94:
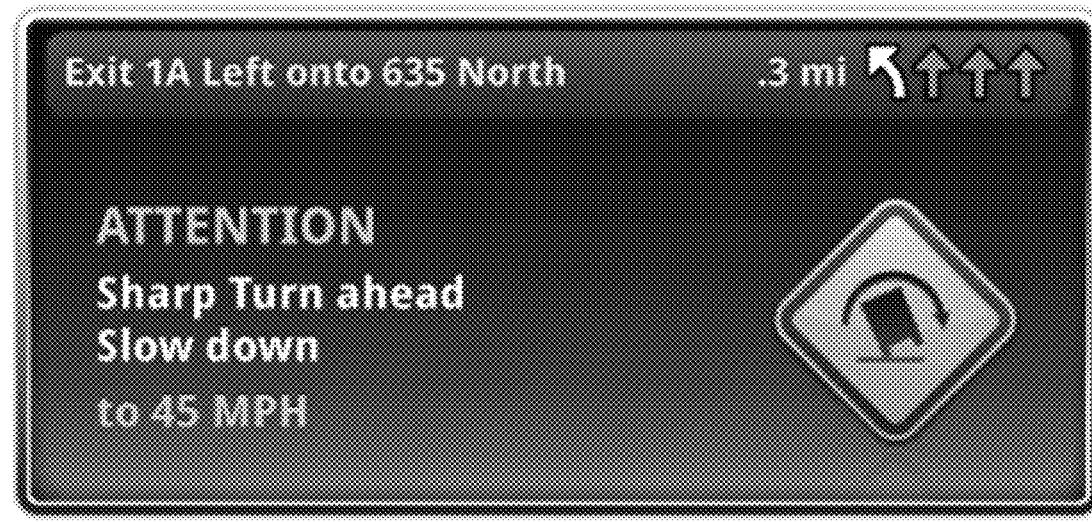
Figure 95:
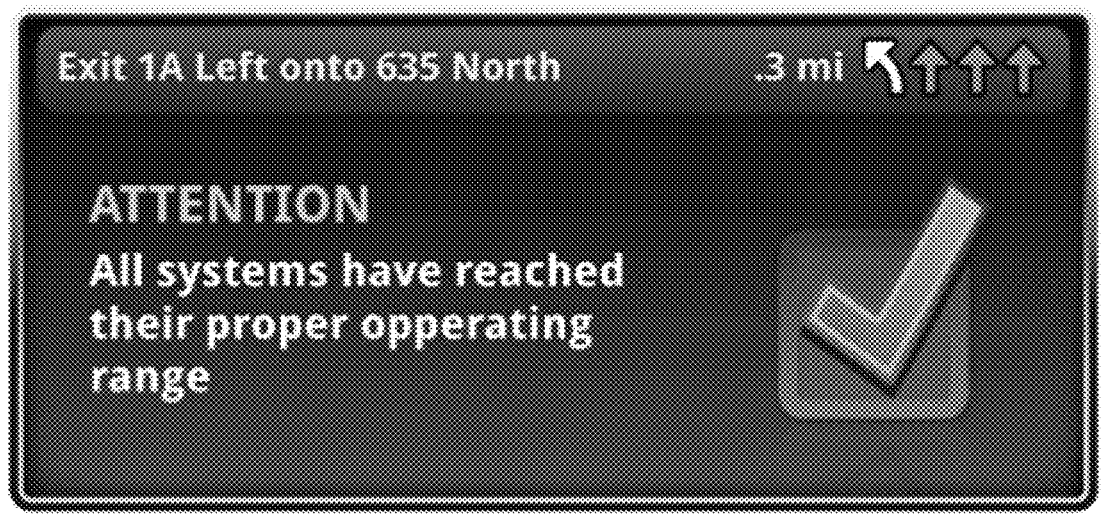
Figure 96:
Figure 97:
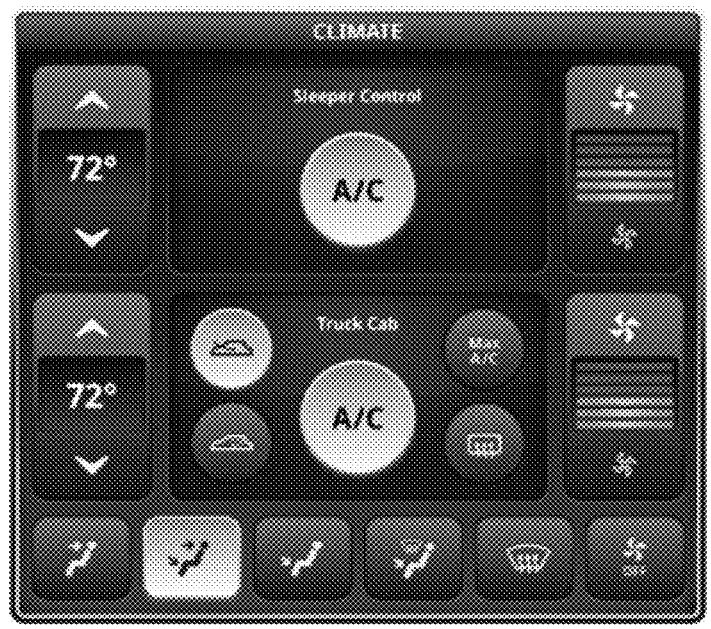
FIGS. 97-105 are exemplary screen captures of the system control windows provided by various embodiments of the present invention.
Figure 98:
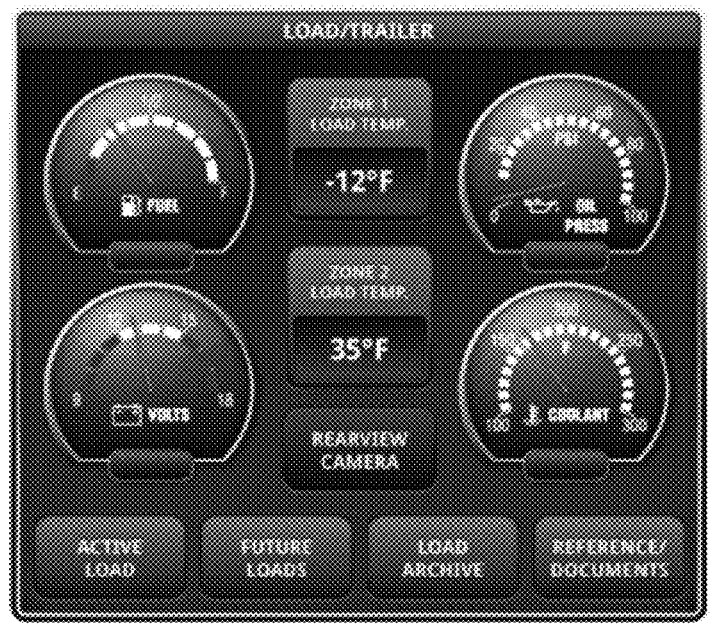
Figure 99:
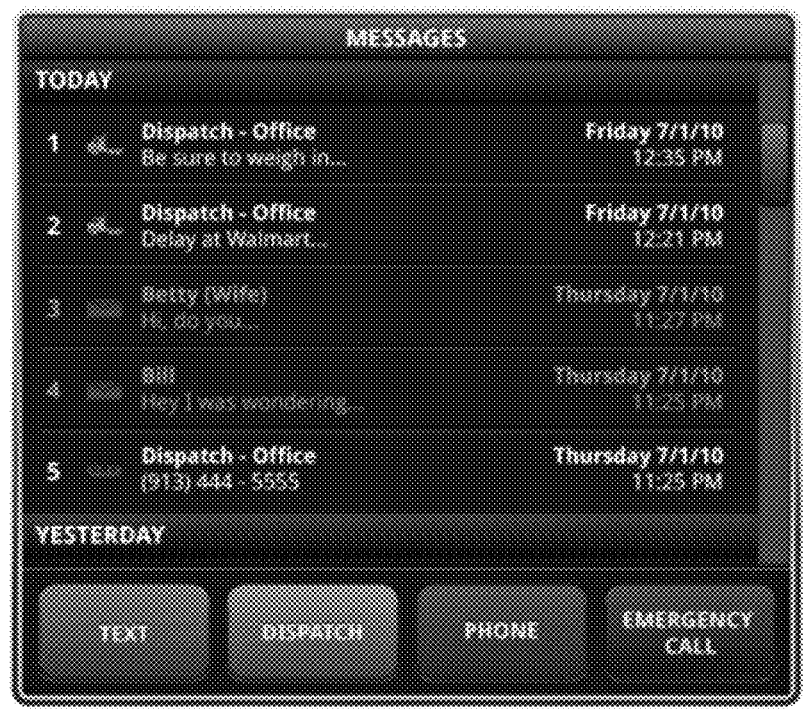
Figure 100:
Figure 101:
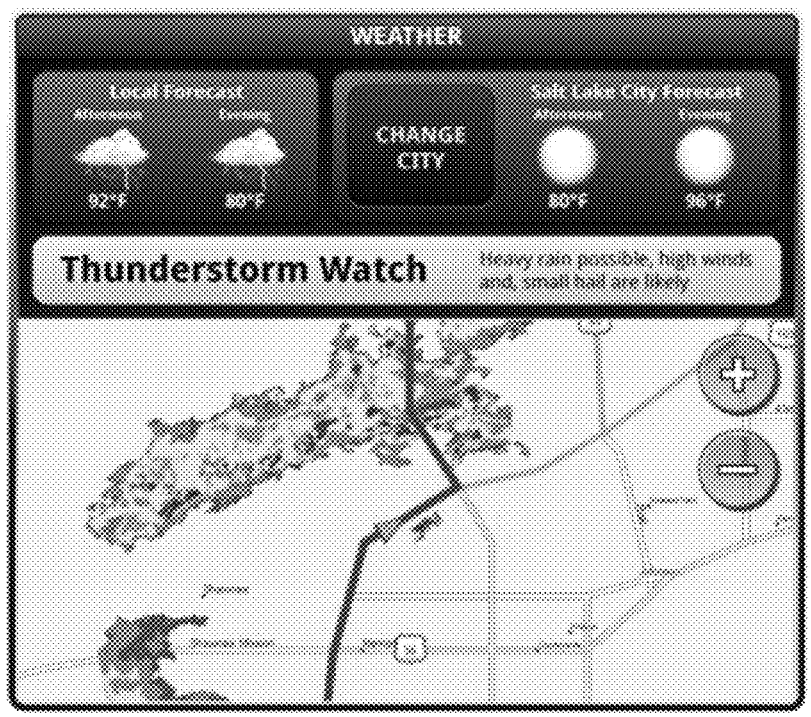
Figure 102:
Figure 103:
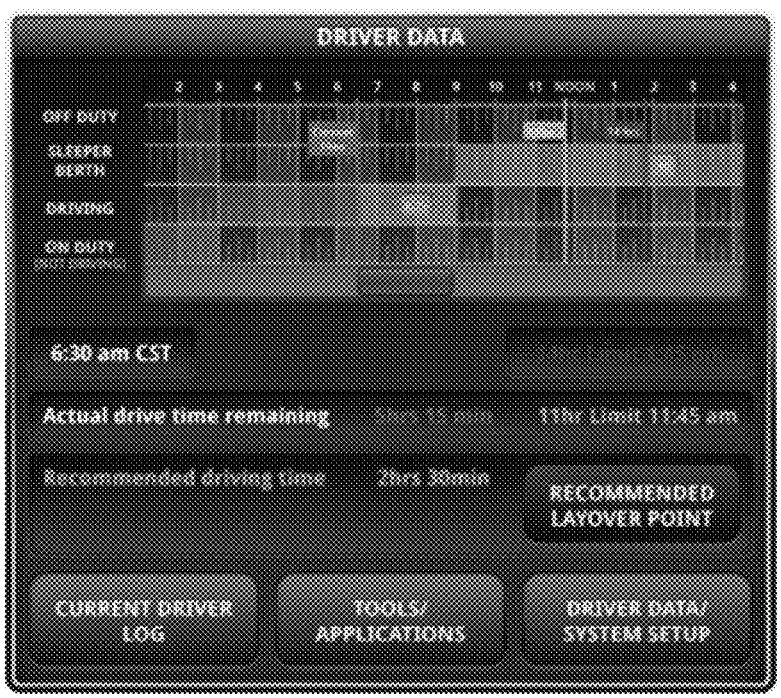
Figure 104:
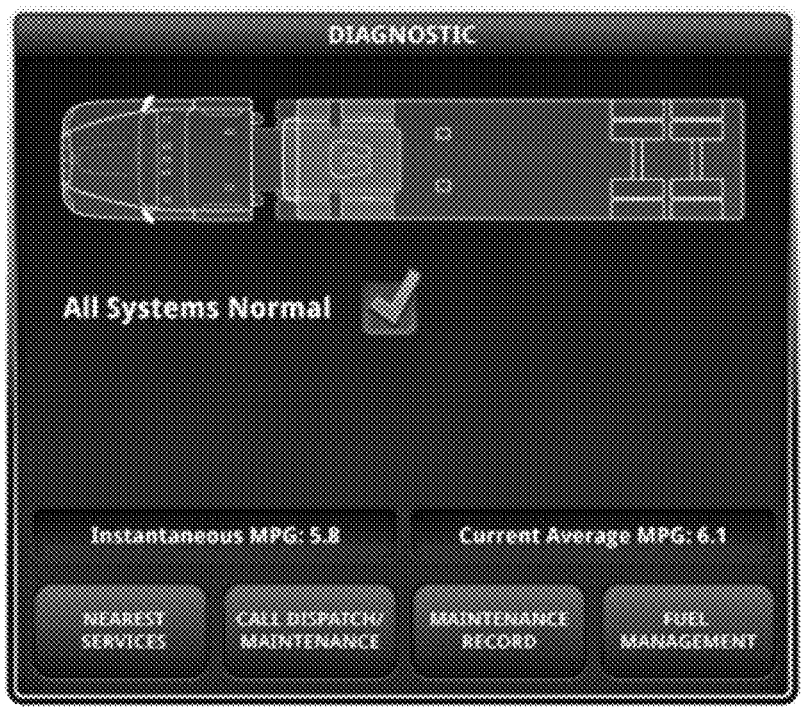

As shown in FIGS. 28-30, the system may provide many fuel related services. FIG. 28 illustrates an embodiment of the current invention wherein the system provides information related to historical fuel performance of the vehicle. FIG. 29 illustrates an embodiment of the current invention wherein the system recommends one or more fueling locations. FIG. 30 illustrates an embodiment of the current invention wherein the system provides information related to historical fuel purchases. In some embodiments, the system is operable to determine the optimal time for refueling and/or recommend for fueling locations based on one or more criteria (i.e., fuel price, fuel purchased, distance traveled, cost per gallon adjustments, total amount of sale, IFTA surcharge, etc). Individual criterions for determining the optimal time for refueling and/or recommending fueling locations may be selected and/or weighted for significance by the vehicle operator or a third party.

In some embodiments, the system may manage preferred fuel suppliers. For instance, the system may determine which fueling locations along the planned route of travel belong to preferred fuel suppliers and calculate anticipated savings as a result of refueling at these recommended fueling locations. Preferred fueling locations may be ranked by preference and distinguished from other fueling locations by the system using any method. In some embodiments, preferred fueling locations may be distinguished using icons, such as stars. For instance, a highly preferred fueling location may be presented with 5 icons, whereas a preferred fueling location of standard weight may be presented with 1 to 3 icons. In some embodiments, the system may use the routing module to determine how many icons to present with the fueling location. For instance, if a preferred fueling location of standard weight (e.g., 2 icons) is located along the intended route, the system may present the fueling location with an increased number of icons, such as 4 icons.

The digital instrument panel portion may provide information regarding the fuel economy for the vehicle. This includes, but is not limited to, historic fuel economy data, current fuel economy estimate based on engine performance, and fuel economy forecasts based on travel information. In some embodiments, the system may determine, and present an indication to the operator of the optimal moment to shift transmission gears based on performance and/or fuel economy criteria.

System Control Windows

Figure 105:
Figure 106:
FIGS. 106-118 are exemplary screen captures of the media player features provided by various embodiments of the present invention.
Figure 107:
Figure 108:
Figure 109:
Figure 110:
Figure 111:
Figure 112:
Figure 113:
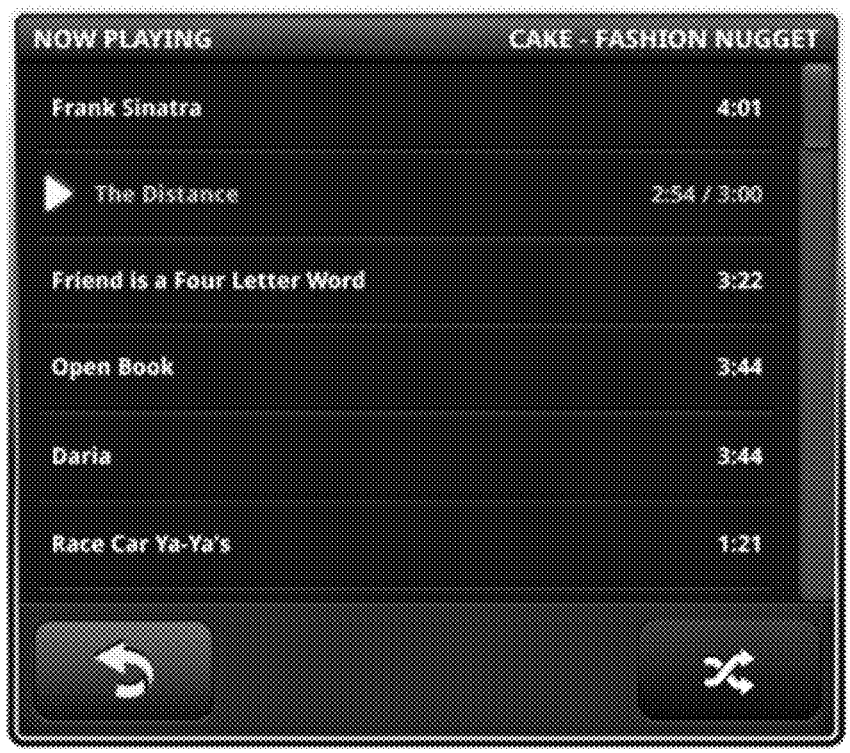
Figure 114:
Figure 115:
Figure 116:
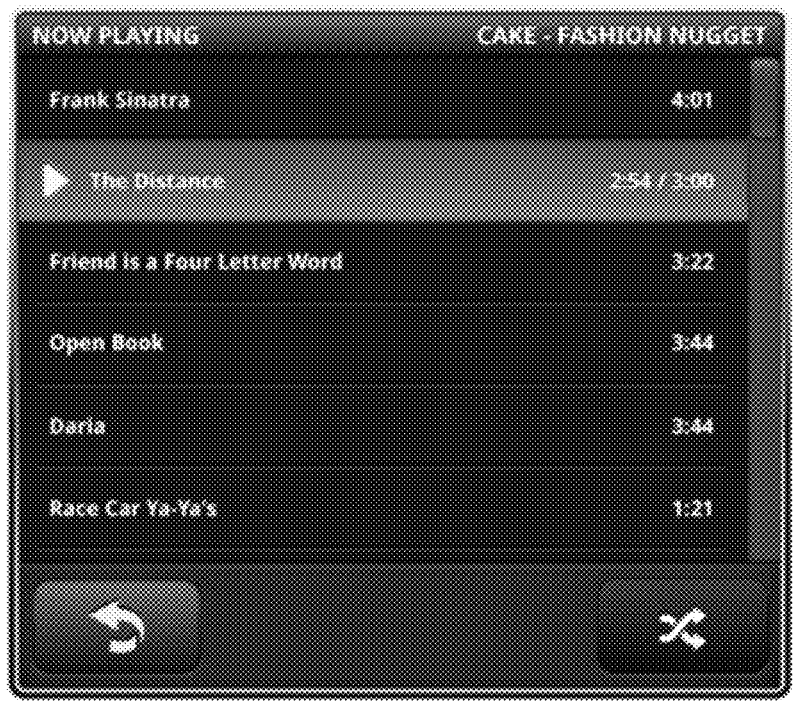
Figure 117:
Figure 118:
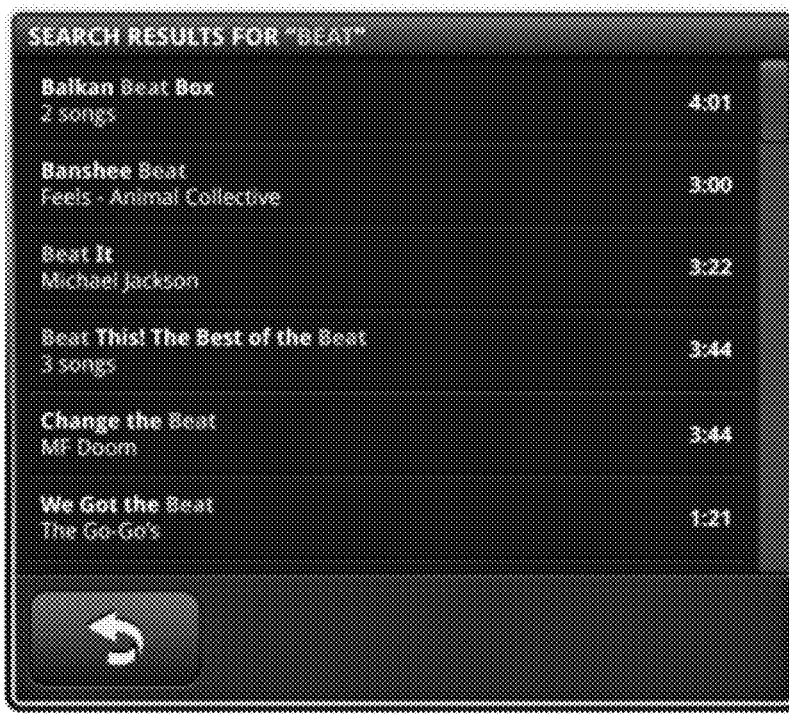
Figure 119:
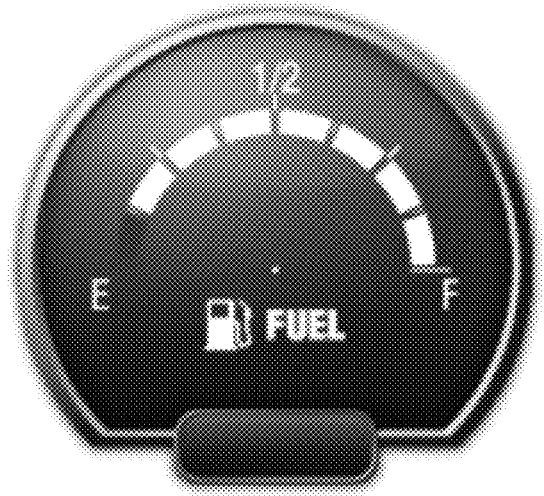
FIGS. 119-136 are exemplary screen captures of gauges presented in various embodiments of the present invention.
Figure 120:
Figure 121:
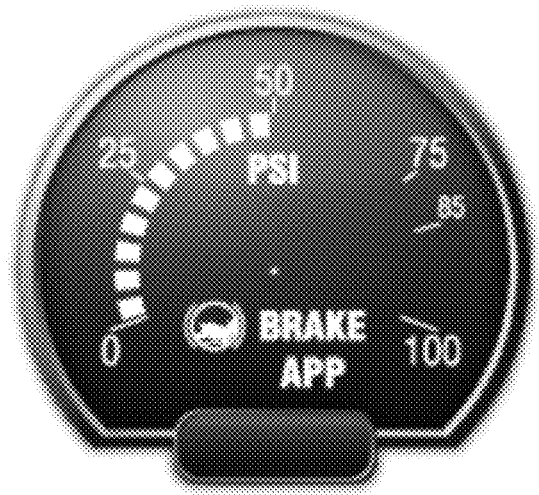
Figure 122:
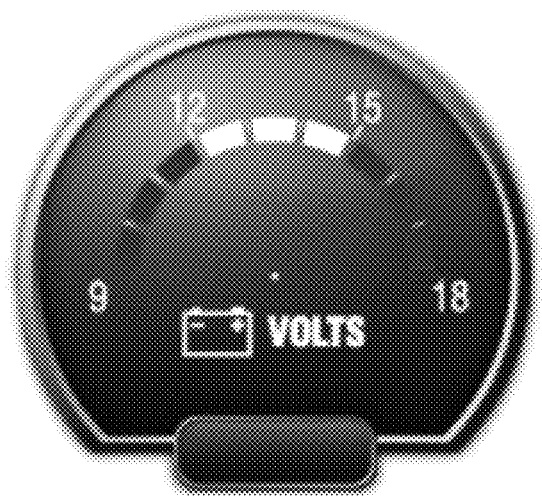
Figure 123:
Figure 124:
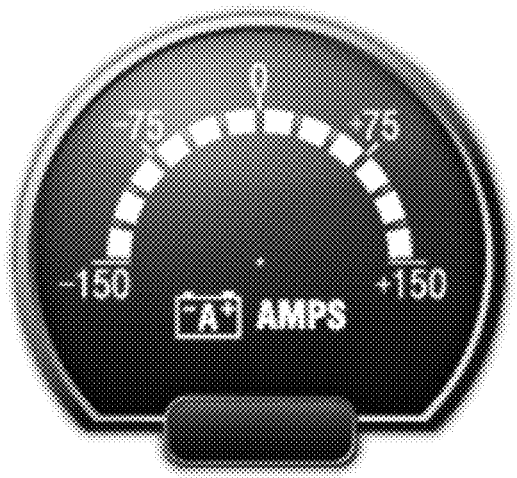
Figure 125:
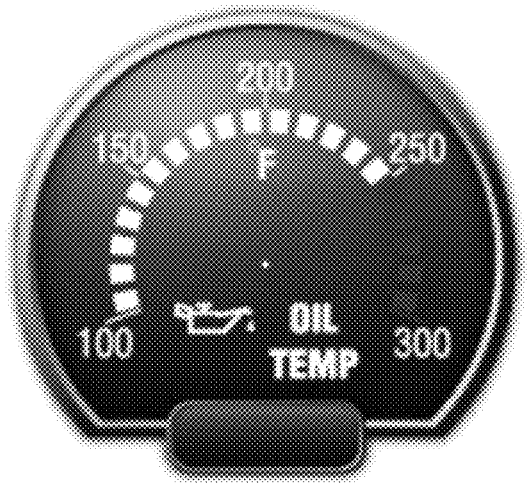
Figure 126:
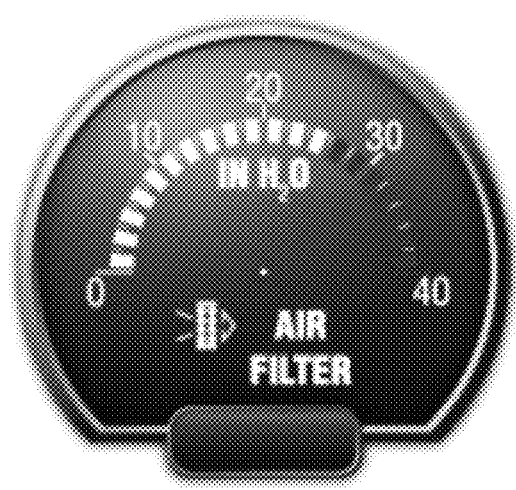
Figure 127:
Figure 128:
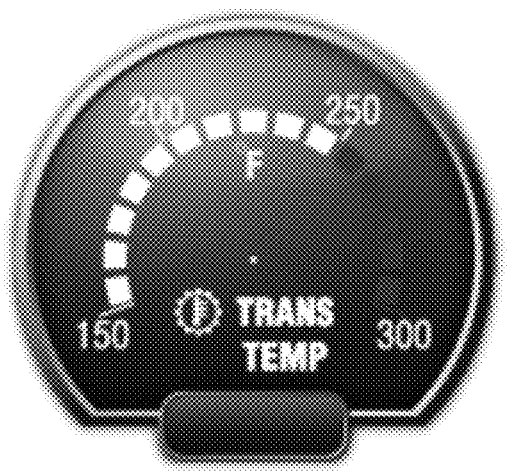
Figure 129:
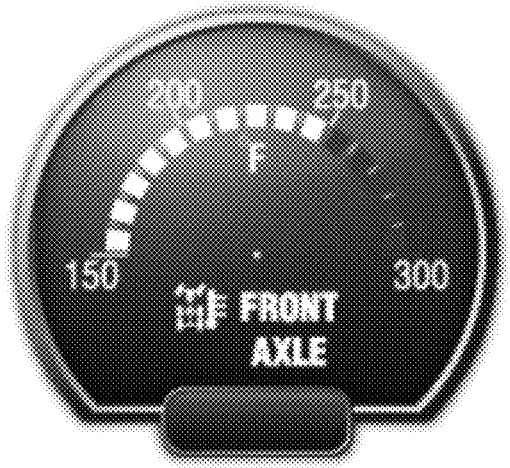
Figure 130:
Figure 131:
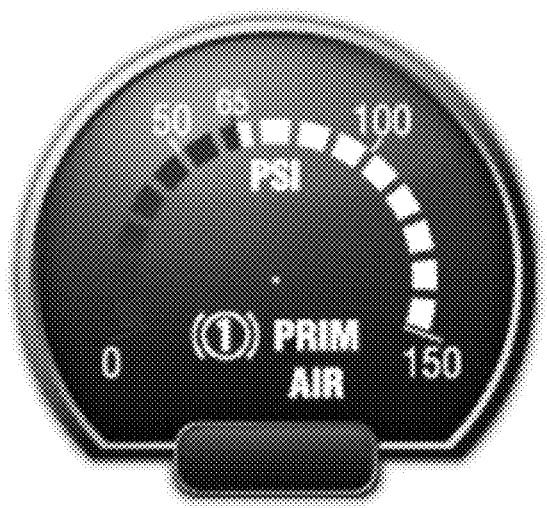
Figure 132:
Figure 133:
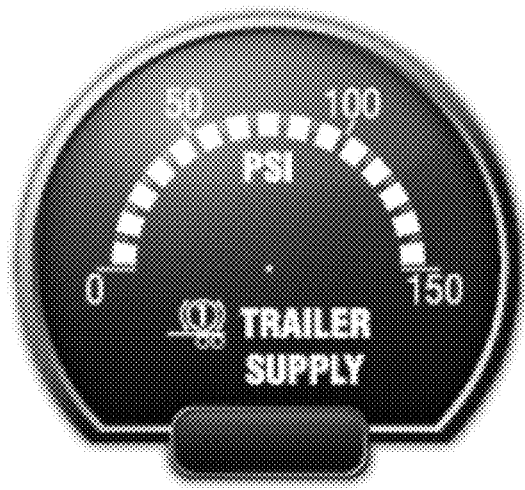
Figure 134:
Figure 135:
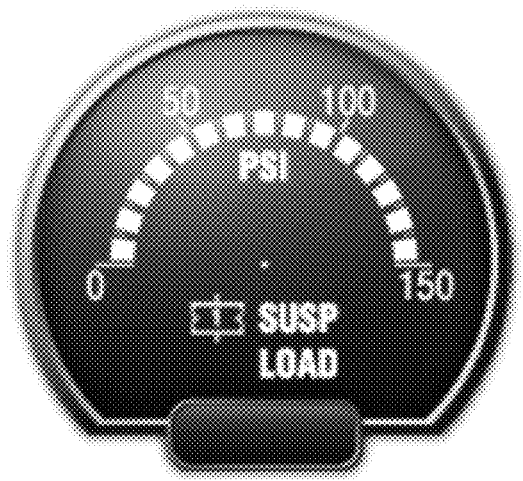
Figure 136:
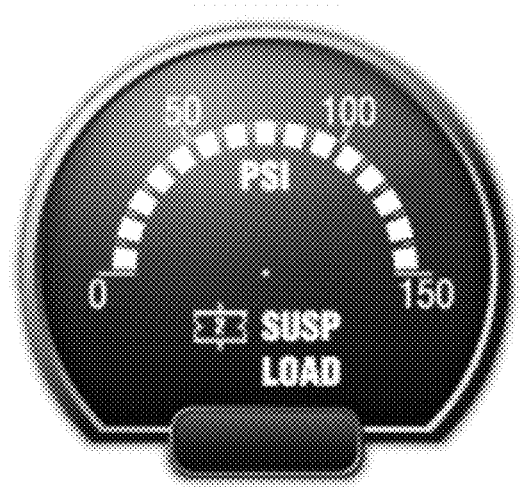

Exemplary system control windows 202 presented within the secondary display panel 201 comprise the content presented in FIGS. 97-105. For example, as shown in FIG. 105, the system control window may present one or more images received from one or more cameras mounted at locations where the truck operator has limited visibility.

The secondary display panel 201 may be used in an audio interface mode to provide the vehicle operator information and controls for one or more available audio sources (i.e., media player). While the secondary display panel 201 is in the audio interface mode, the presented contents may include one or more system control windows 202 in combination with other elements. The content of the system control window 202 comprises the content presented in FIGS. 106-118.

Instrumentation Content

In some embodiments, the independent enhancement elements 205 and 206 in the secondary display panel 201 may be instrumentation content (e.g., gauges). The instrumentation content available for use as independent enhancement elements 205 and 206 in the secondary display 201 comprise the gauges presented in FIGS. 119-136.

The gauges of FIGS. 119-136 may be presented to the operator in the digital instrument panel portion of the primary display panel 101 as instrumentation content. Instrumentation content may include gauges or other sensor readings or calculations related to the performance of the truck or trailer.

System Recommendations

Figure 137:
FIGS. 137-138 are exemplary screen captures of features providing recommendation information in various embodiments of the present invention.

In some embodiments, the infotainment system may recommend layovers. For example, as shown in FIG. 137, the system may recommend a layover location with information comprising location information, distance to the location, services available at the location, indication of preference, and functionality for the truck operator to input his plans (e.g., accept, decline, tentative) the recommended layover location.

Figure 138:
Figure 139:
FIGS. 139-140 are exemplary screen captures of searching functionality in various embodiments of the present invention.
Figure 140:
Figure 141:
FIGS. 141-149 are exemplary screen captures of features providing communication information in various embodiments of the present invention.
Figure 142:
Figure 143:
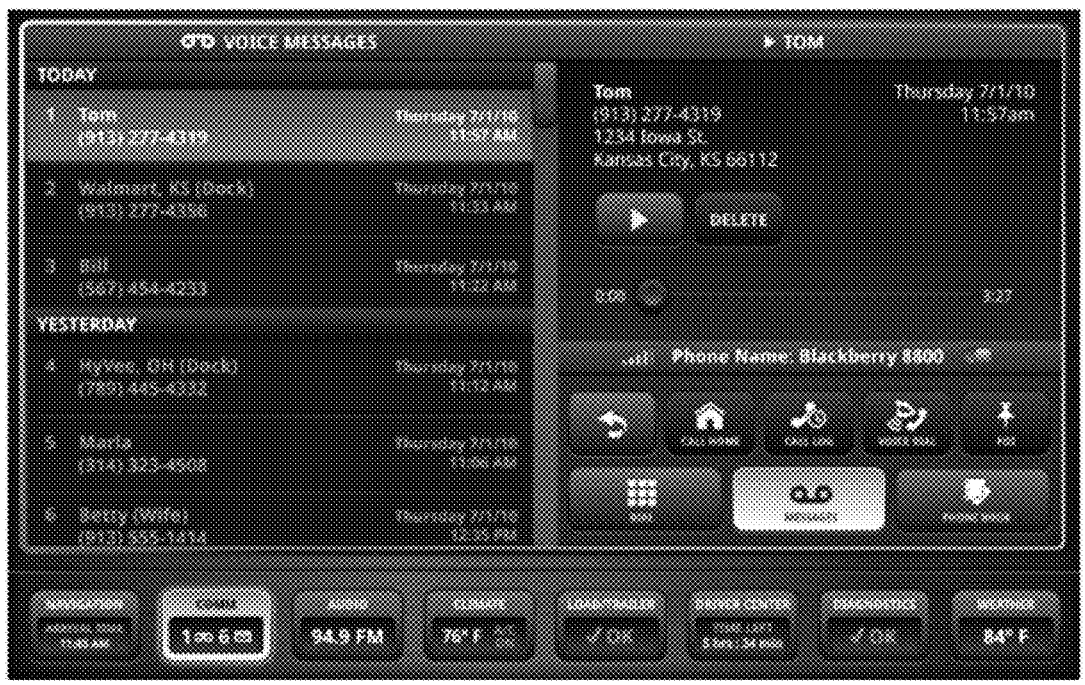
Figure 144:
Figure 145:
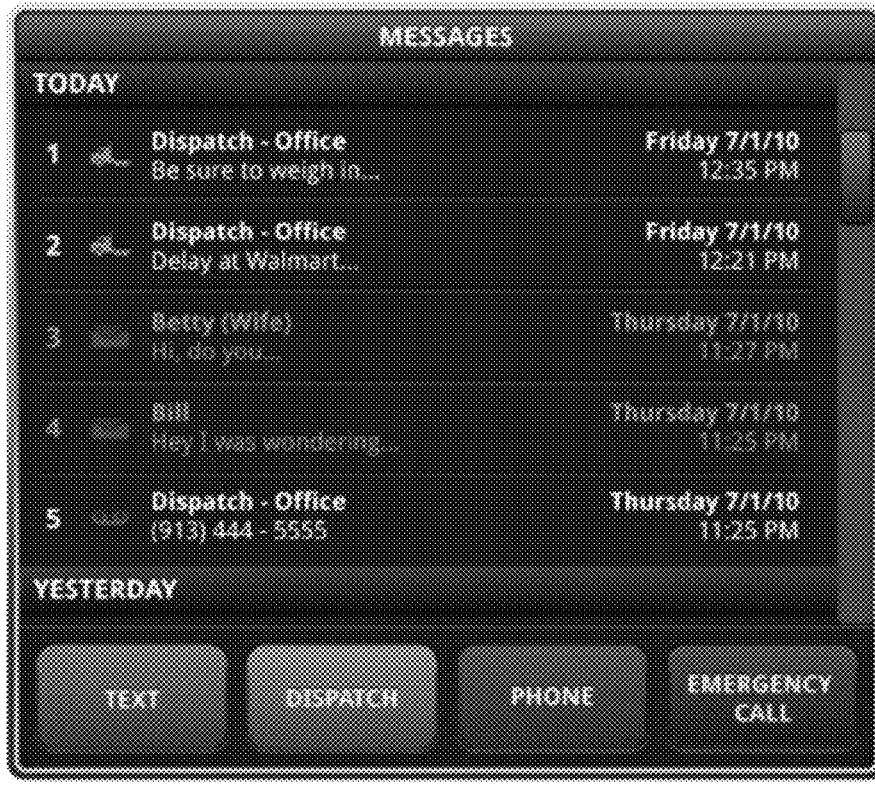
Figure 146:
Figure 147:
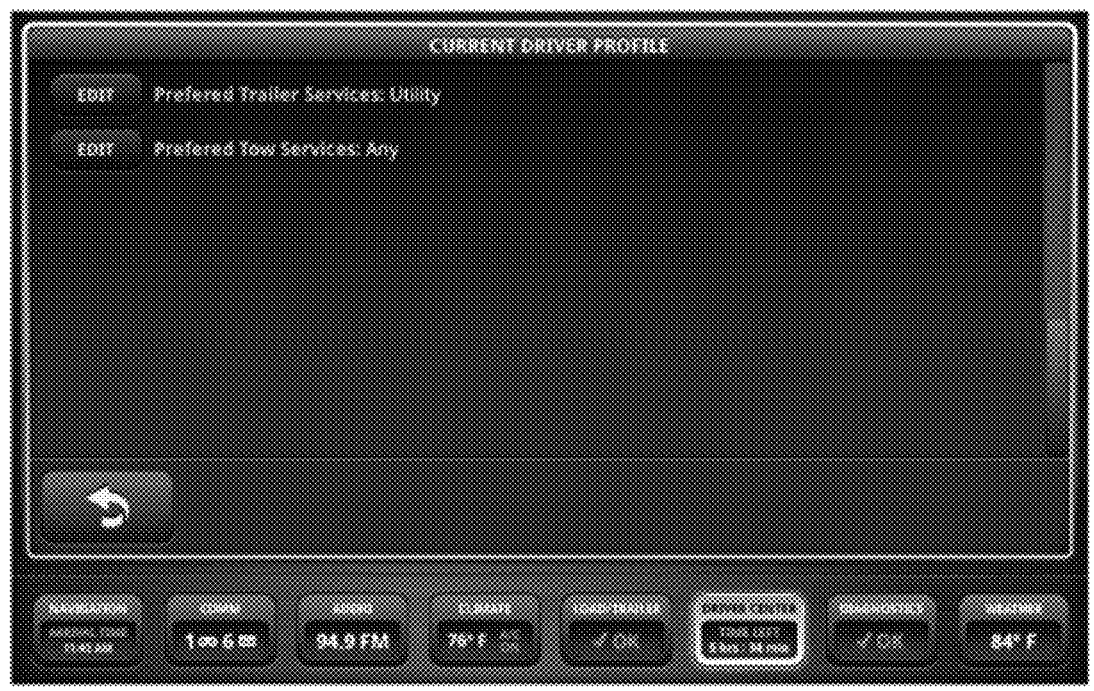
Figure 148:
Figure 149:
Figure 150:
FIGS. 150-153 are exemplary screen captures of load management functionality provided by various embodiments of the present invention.
Figure 151:
Figure 152:
Figure 153:
Figure 154:
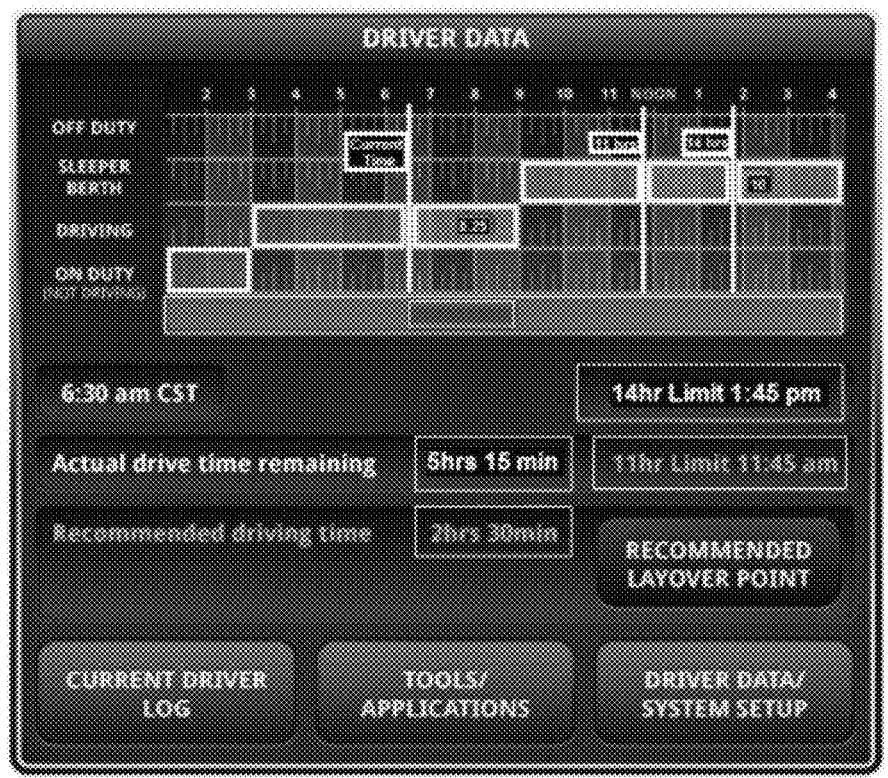
FIGS. 154-161 are exemplary screen captures showing system functionality provided by various embodiments of the present invention.
Figure 155:
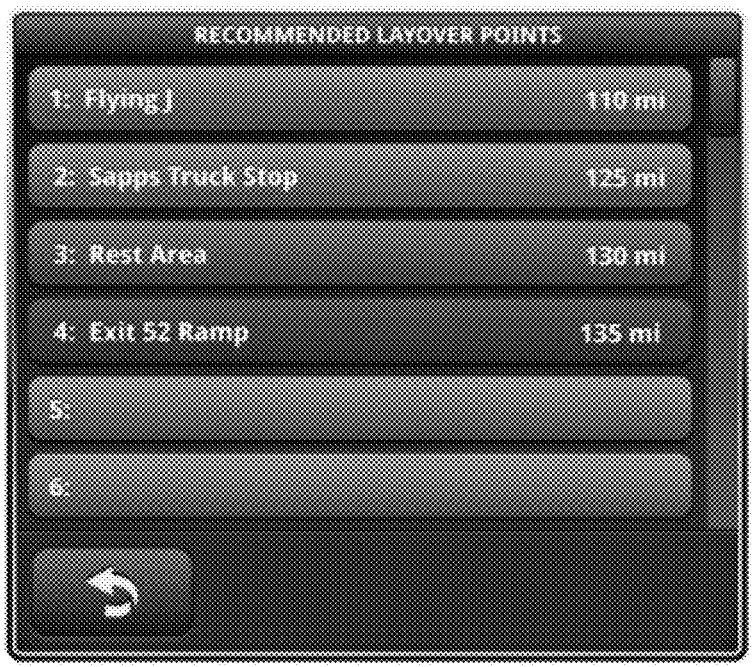
Figure 156:
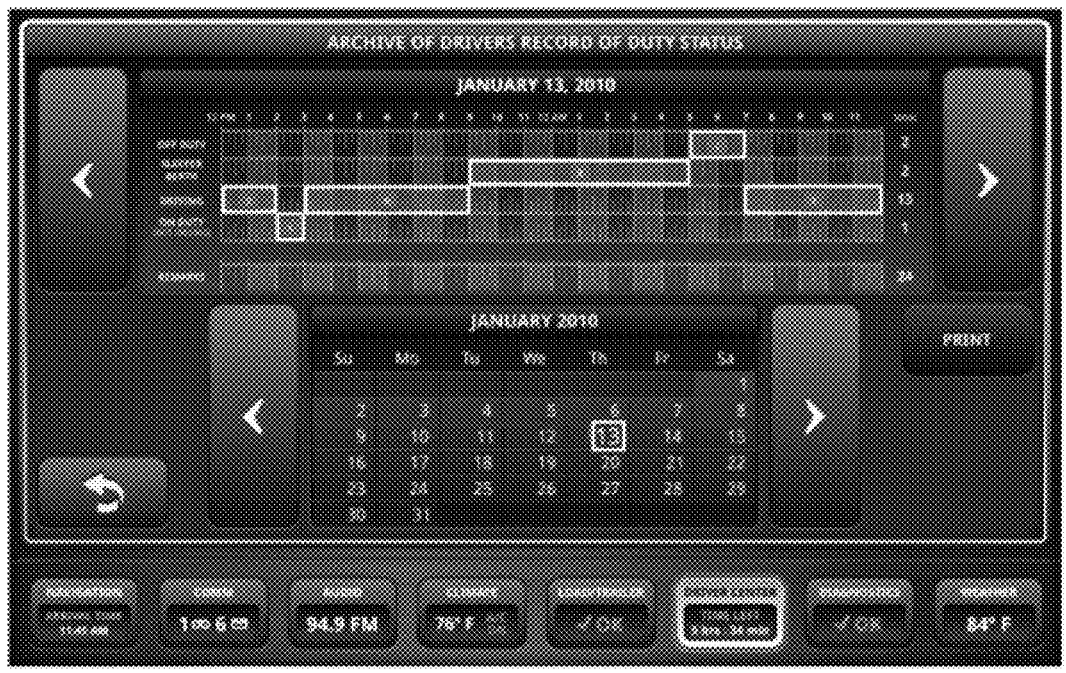
Figure 157:
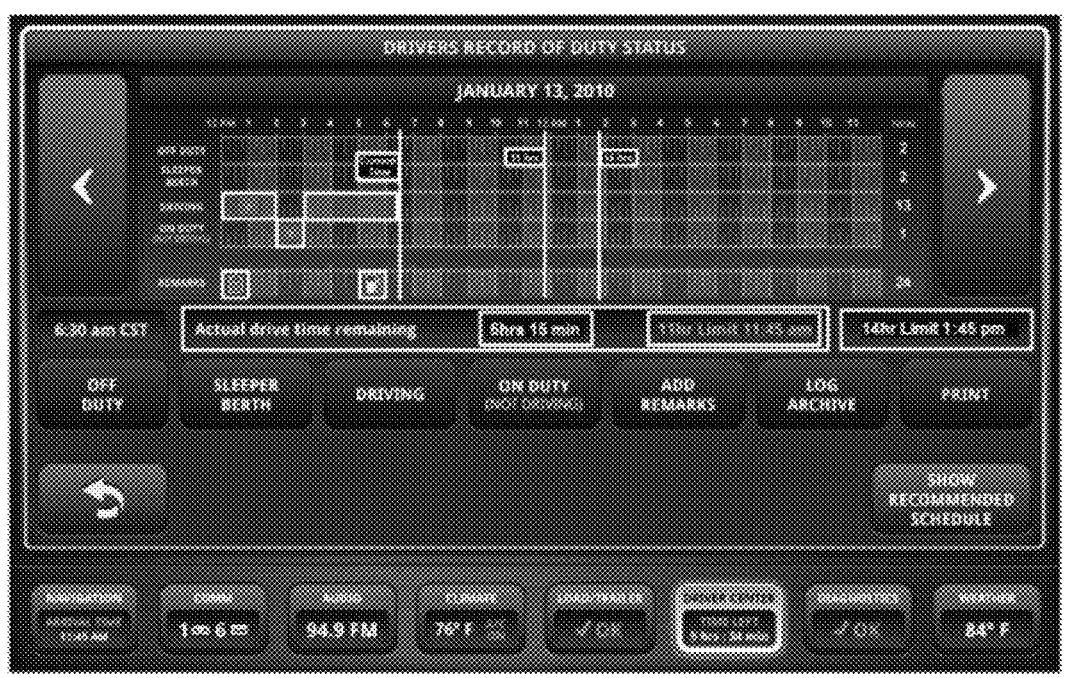
Figure 158:
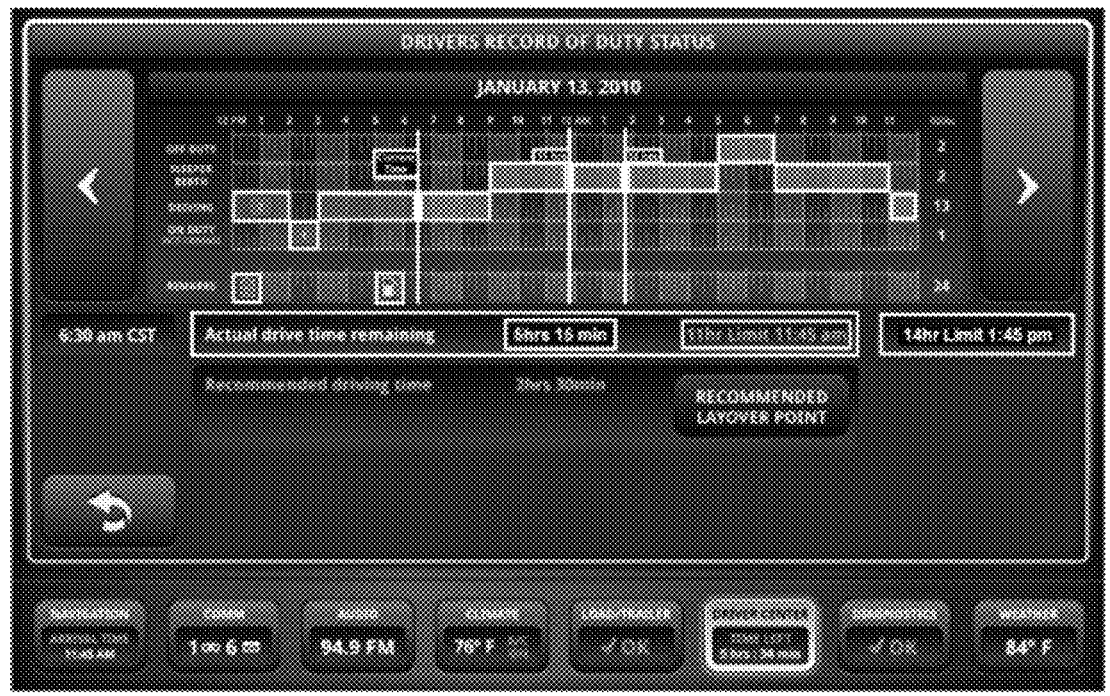
Figure 159:
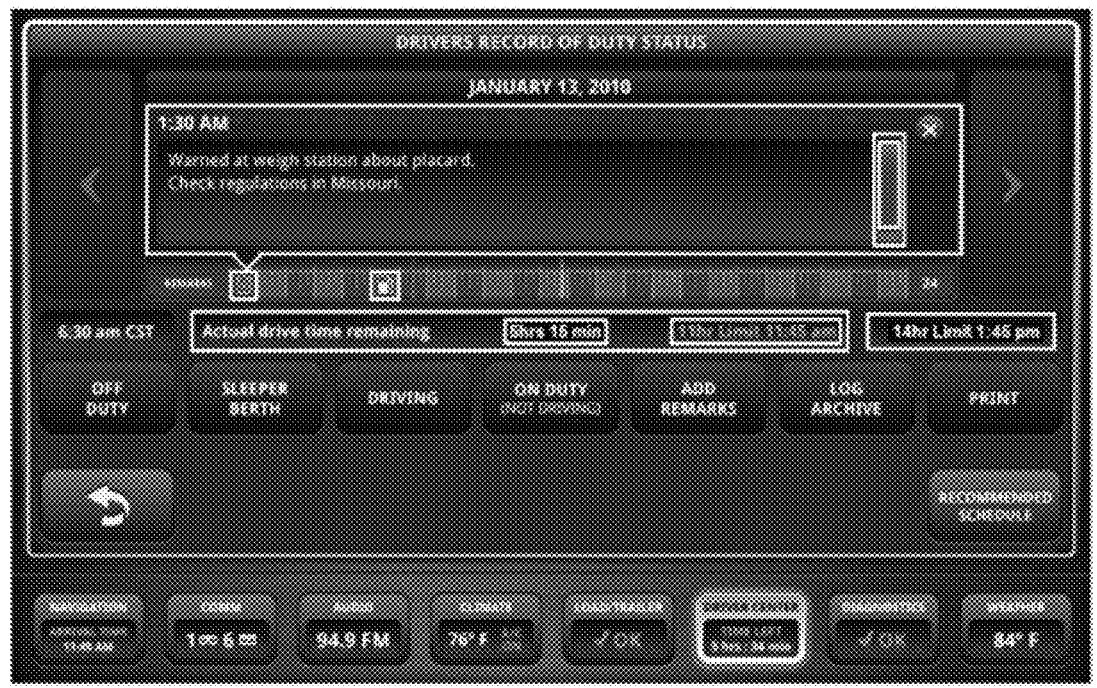
Figure 160:
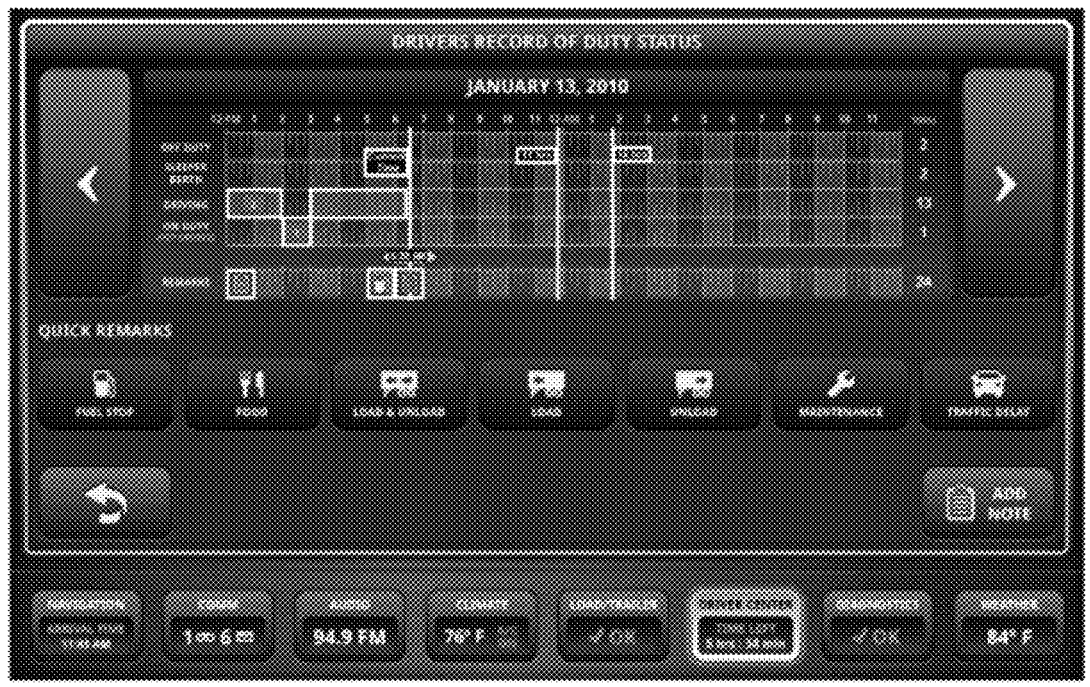
Figure 161:
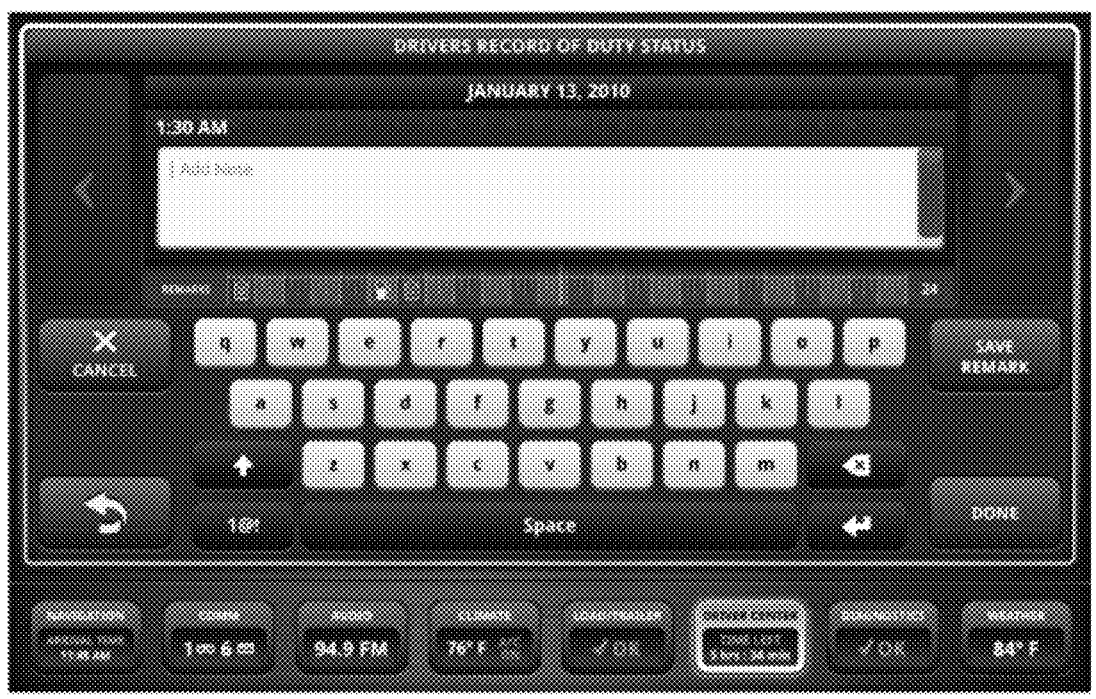

In some embodiments, the infotainment system may recommend refueling locations. For example, as shown in FIG. 138, the system may recommend a refueling location with information comprising location information, distance to the location, fuel pricing information, indication of preference, and functionality for the truck operator to input his plans (e.g., accept, decline, tentative) the recommended layover location.

The information provided with a recommended location may include other services offered, feedback, vacancy, reservation and/or ordering functionality, and hours of operation. In some embodiments, the information presented may be customized by the truck operator or a third party.

The above specification provides a description of the method and apparatus of the present disclosure. It is to be understood that the above description has been made in an illustrative fashion, and not a restrictive one. Although the system has been described in language specific to structural features and/or methodological acts, it is to be understood that the appended claims are not necessarily limited to the specific features or acts described above and that the specific features and acts are disclosed as exemplary forms of implementing the claimed devices and techniques. Since many variations can be made without departing from the spirit and scope of the present disclosure, this specification merely sets forth some of the many possible examples. Therefore, the scope of one or more examples of the present disclosure should be determined with reference to the appended claims, along with the full range of equivalents to which such claims are entitled.

What is claimed is:

1. A navigation system integrated into a materials transport vehicle for use by an operator, the system comprising:
 a plurality of display devices each having a screen, at least one of the display devices having a touch screen to receive an operator input;
 a location determining component operable to determine the current location of the materials transport vehicle;
 a memory operable to store one or more modules, the memory including vehicle operator transport preferences comprising time periods available for operating the materials transport vehicle and materials transport requirements comprising a plurality of materials transport destinations associated with a plurality of loads of material; and
 a processor operable to execute the one or more modules to:
  detect an operator input associated with the vehicle operator transport preferences,
  determine a transport schedule for use by the materials transport vehicle operator, the transport schedule based on the materials transport requirements and the vehicle operator transport preferences,
  determine an order for loading and unloading transportation materials based upon variations in the size and weight of the loads of material,
  determine a transport route from the current location to the plurality of materials transport destinations using the transport schedule, and
  present the transport route on one of the display devices;
 wherein materials of varying size and weight are loaded onto the materials transport vehicle for delivery to the materials transport destinations; and
 wherein the materials transport requirements include at least one of a materials transport deadline, environmental condition, required equipment or delivery terms.

2. The navigation system as recited in claim 1, wherein the vehicle operator transport preferences include preferred points of interest and transport scheduling criteria, the preferred points of interest including at least one of vehicle refueling locations, weigh points, or rest areas.

3. The navigation system as recited in claim 1, wherein the processor is further operable to determine a loading cost for the loads of material.

4. The navigation system as described in claim 1, wherein the environmental condition is a temperature for the loads of material.

5. The navigation system as described in claim 1, wherein the processor is operable receive a signal from the touch screen that indicates an input associated with the vehicle operator transport preferences.

6. The navigation system as described in claim 1, wherein the materials transport deadline is a number of days to deliver the loads of material to a destination.

7. The navigation system as described in claim 1, wherein the processor is operable to execute one or more modules to determine a transport route with an arrival time no later than the materials transport deadline.

8. The navigation system as described in claim 1, wherein the vehicle operator transport preferences further comprise suitability criteria, the suitability criteria comprising one of anticipated profit and proximity to the transport route, and the materials transport requirements further comprise transport financial information.

9. The navigation system as described in claim 8, wherein the processor is operable to execute one or more modules to identify available materials that do not satisfy the suitability criteria.

10. The navigation system as described in claim 9, wherein the available materials that do not satisfy the suitability criteria are presented with the transport route on one of the display devices.

11. A navigation system integrated into a materials transport vehicle for use by an operator, the system comprising:
    a plurality of display devices each having a screen, at least one of the display devices having a touch screen to receive an operator input;
    a location determining component operable to determine the current location of the materials transport vehicle;
    a memory operable to store one or more modules, the memory including vehicle operator transport preferences comprising time periods available for operating the materials transport vehicle, regulatory information, a driving history of the vehicle operator, and materials transport requirements comprising a plurality of materials transport destinations associated with a plurality of loads of material; and
    a processor operable to execute the one or more modules to:
        detect an operator input associated with the vehicle operator transport preferences,
        determine a transport schedule for use by the materials transport vehicle operator,
            the transport schedule based on the materials transport requirements, the regulatory information, the driving history of the vehicle operator, and the vehicle operator transport preferences,
        determine a transport route from the current location to the plurality of materials transport destinations using the transport schedule, and
        present the transport route on one of the display devices;
    wherein materials of varying size and weight are loaded onto the materials transport vehicle for delivery to the materials transport destinations;
    wherein the materials transport requirements include at least one of a delivery deadline, environmental condition, required equipment or delivery terms; and
    wherein the processor is further operable to determine an order for loading and unloading transportation materials based upon variations in the size and weight of the loads of material.

12. The navigation system as recited in claim 11, wherein the processor is operable to execute one or more modules to present a transport schedule on one of the display devices.

13. The navigation system as recited in claim 12, wherein the transport schedule identifies suggested time periods for the vehicle operator to operate the vehicle.

14. The navigation system as recited in claim 11, wherein the regulatory information corresponds to one or more geographic regions.

15. The navigation system as recited in claim 14, wherein the processor is operable to execute one or more modules to determine the applicable regulatory information for various points along the transport route.

16. The navigation system as recited in claim 11, wherein the regulatory information comprises a maximum period of time during which the vehicle operator may operate the vehicle.

17. The navigation system as recited in claim 11, wherein the regulatory information comprises stops at weigh points where the materials transport vehicle must be weighed.

18. A navigation system for a materials transport vehicle, the navigation system comprising:
    a plurality of display devices integrated into a primary display panel and a secondary display panel of the materials transport vehicle, the display devices each having a screen with a diagonal length of at least 10 inches, wherein at least one display device comprises a touch screen operable to receive an operator input;
    a location determining component operable to determine the current location of the materials transport vehicle;
    a memory operable to store one or more modules, the memory including vehicle operator transport preferences and materials transport requirements comprising a plurality of materials transport destinations associated with a plurality of load of materials; and
    a processor operable to execute the one or more modules to:
    detect an operator input associated with the vehicle operator transport preferences,
    determine an order for loading and unloading transportation materials based upon variatins in the size and weight of the loads of material,
    determine a transport schedule and a transport route to the plurality of material transport destinations, and
    present the transport route on one of the display devices;
    wherein materials of varying size and weight are loaded onto the materials transport vehicle for delivery to the materials transport destinations; and
    wherein the materials transport requirements include at least one of a delivery deadline, environmental condition, required equipment or delivery terms.

19. A method of determining a transport schedule and a transport route for a navigation system, the method comprising the steps of:
    determining, using a location determining component, the current location of the materials transport vehicle, receiving materials transport requirements comprising a plurality of materials transport destinations associated with a plurality of loads of material and vehicle operator transport preferences from a memory using a touch screen of a display device, determining, using a processor, a transport schedule based on the materials transport requirements and the vehicle operator transport preferences, determining, using the processor, an order for loading and unloading transportation materials based upon variations in the size and weight of the loads of material, determining, using the processor, a transport route from the current location to the plurality of materials transport destinations using the transport schedule, and presenting, using the processor, the transport route on one of the display devices;

wherein materials of varying size and weight are loaded onto the materials transport vehicle for delivery to the materials transport destinations; and wherein the materials transport requirements include at least one of a delivery deadline, environmental condition, required equipment or delivery terms.

20. The method of claim 19, further comprising the step of communicating the transport schedule and operator data to a remote computing device.

21. The method of claim 19, wherein the materials transport requirements and vehicle operator transport were received from a remote computing device.

22. The navigation system as recited in claim 11, wherein the processor is further operable to determine a loading cost for the loads of material.

23. The navigation system as recited in claim 11, wherein the environmental condition is a temperature for the loads of material.

* * * * *